(12) United States Patent
Hong et al.

(10) Patent No.: US 6,684,074 B1
(45) Date of Patent: Jan. 27, 2004

(54) SWITCHING DEVICE IN DIGITAL UNIT OF MULTI-SECTOR BASE STATION

(75) Inventors: Sung Uk Hong, Ichon-shi (KR); Shin Ha Kang, Seoul (KR); Ho Jin Lee, Ichon-shi (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 511 days.

(21) Appl. No.: 09/610,803

(22) Filed: Jul. 6, 2000

(30) Foreign Application Priority Data

Jul. 7, 1999 (KR) .......................... 1999-27309

(51) Int. Cl.[7] ................................ H04Q 7/20
(52) U.S. Cl. ......................... 455/436; 455/561
(58) Field of Search ...................... 455/436, 443, 455/445, 561, 562, 277.1, 277.2

(56) References Cited

U.S. PATENT DOCUMENTS

| | | | |
|---|---|---|---|
| 5,889,494 A | | 3/1999 | Reudink et al. |
| 6,070,090 A | * | 5/2000 | Feuerstein |
| 6,148,218 A | * | 11/2000 | Solondz |
| 6,259,419 B1 | * | 7/2001 | Monte |
| 6,463,302 B1 | * | 10/2002 | Kang et al. |

* cited by examiner

Primary Examiner—Sinh Tran
Assistant Examiner—Huy D Nguyen
(74) Attorney, Agent, or Firm—Merchant & Gould P.C.

(57) ABSTRACT

A switching device in a digital unit of a multi-sector base station, which uses switching elements incorporated in the digital unit and adapted to switch 3 sectors into multiple sectors, thereby being capable of implementing a multi-sector base station system allowing a softer handoff among all sectors. The switching elements are adapted to support the switching of the next channel element stage in the digital unit included in the existing 3-sector base station to implement a base station system, thereby allowing all handoff between sectors to be conducted in a softer handoff fashion while allowing all channel elements to be set for all sectors covered by the base station upon setting a traffic channel, thereby achieving an efficient allocation of channel elements. In accordance with the present invention, a 6-sector base station system is efficiently implemented in accordance with the setting of a timing capable of supporting an addition of switching elements, an operation of switching elements upon setting pilot, sync, and access channels, and an operation of switching elements upon a handoff and call setting. Since one digital unit can support 6 sectors, the overall configuration of the multi-sector base station system can be simplified and easily made.

13 Claims, 19 Drawing Sheets

FIG.12a

| ADDRESS | NAME | REFERRING TO Fig. 3 | BITS USED | DETAILED INFORMATION | ACCESS |
|---|---|---|---|---|---|
| 00 H | Switch_Con0_A | Switch Controller_A | 7:5, 2:0 | (⊞2) | R/W |
| 01 H | Switch_Con1_A | Switch Controller_A | 2:0 | (⊞2) | R/W |
| 02 H | Switch_Con0_B | Switch Controller_B | 5:0 | (⊞3) | R/W |
| 03 H | Switch_Con1_B | Switch Controller_B | | (⊞3) | R/W |
| 04 H | OP_Con_A | Operation Control Register_A | 5:0 | (⊞4) | R/W |
| 05 H | OP_Con_B | Operation Control Register_B | 5:0 | (⊞4) | R/W |
| 06 H | Parity_Int_Clr_A | Output of Function Decoder Int_Clr_Sigs_A | Not Used | (Note 1) | W |
| 07 H | Parity_Int_Clr_B | Output of Function Decoder Int_Clr_Sigs_B | Not Used | (Note 1) | W |
| 06 H | I_Block_Status_A | Block Status Register_A | 5:0 | (⊞5) | R |
| 07 H | Q_Block_Status_A | Block Status Register_A | 5:0 | (⊞6) | R |
| 08 H | I_Parity_Status_A | Interrupt Status Register_A | 5:0 | (⊞5) | R |
| 09 H | Q_Parity_Status_A | Interrupt Status Register_A | 5:0 | (⊞6) | R |
| 0A H | I_Block_Status_B | Block Status Register_B | 5:0 | (⊞7) | R |
| 0B H | Q_Block_Status_B | Block Status Register_B | 5:0 | (⊞8) | R |
| 0C H | I_Parity_Status_B | Interrupt Status Register_B | 5:0 | (⊞7) | R |
| 0D H | Q_Parity_Status_B | Interrupt Status Register_B | 5:0 | (⊞8) | R |

FIG.12b

| Number of 6 sector to be connected to β sector (0 - 5) | | | Number of 6 sector to be connected to α sector (0 - 5) | | |
|---|---|---|---|---|---|
| Bit7 | Bit6 | Bit5 | Bit4 | Bit3 | Bit2 | Bit1 | Bit0 |
| x000 : Connect β sector to sector 0 | | | x000 : Connect α sector to sector 0 | | |
| x001 : Connect β sector to sector 0 | | | x001 : Connect α sector to sector 1 | | |
| x010 : Connect β sector to sector 0 | | | x010 : Connect α sector to sector 2 | | |
| x011 : Connect β sector to sector 0 | | | x011 : Connect α sector to sector 3 | | |
| x100 : Connect β sector to sector 0 | | | x100 : Connect α sector to sector 4 | | |
| x101 : Connect β sector to sector 0 | | | x101 : Connect α sector to sector 5 | | |

FIG.12c

| Bit7 | Bit6 | Bit5 | Bit4 | Bit3 | Bit2 | Bit1 | Bit0 |
|---|---|---|---|---|---|---|---|
| Not Used ||| Number of 6 sector to be connected to 7 sector (0 - 5) ||||
| | xxxx | | x000 : | Connect 7 sector to sector 0 ||||
| | xxxx | | x001 : | Connect 7 sector to sector 1 ||||
| | xxxx | | x010 : | Connect 7 sector to sector 2 ||||
| | xxxx | | x011 : | Connect 7 sector to sector 3 ||||
| | xxxx | | x100 : | Connect 7 sector to sector 4 ||||
| | xxxx | | x101 : | Connect 7 sector to sector 5 ||||

FIG.12d

| Bit No. | Bit Name | Function |
|---|---|---|
| 4 | PInt_En | 0 : Parity Interrupt Enable<br>1 : Parity Interrupt Disable |
| 3 | Crs_Chk_En | 0 : Cross Check Disable<br>If parity error is generated on I or Q channel, then block only the error-generated channel<br>1 : Cross Check Disable<br>If pariy error is generated at any one of I and Q channels, than disable both the I and Q channels. |
| 2 | Pchk_En | 0 : Parity Check Disable<br>1 : Parity Check Enable |
| 1, 0 | Out_Sel1<br>Out_Sel0 | 00 : Transmit only data of SE<br>01 : Normal Mode → Transmit data of SE and Cascade Data<br>1x : Bypass Mode → Transmit only Cascaded Data |

FIG. 12e

| Bit No. | Bit Name | Function ( 0 : Blocked Status, 1 : Normal Status) |
|---|---|---|
| 7 | Not Defined | 1 Read |
| 6 | Not Defined | 1 Read |
| 5 | /PerrBlk_I5 | I - Channel Block Status of sector 5 |
| 4 | /PerrBlk_I4 | I - Channel Block Status of sector 4 |
| 3 | /PerrBlk_I3 | I - Channel Block Status of sector 3 |
| 2 | /PerrBlk_I2 | I - Channel Block Status of sector 2 |
| 1 | /PerrBlk_I1 | I - Channel Block Status of sector 1 |
| 0 | /PerrBlk_I0 | I - Channel Block Status of sector 0 |

FIG. 12f

| Bit No. | Bit Name | Function ( 0 : Blocked Status, 1 : Normal Status) |
|---|---|---|
| 7 | Not Defined | 1 Read |
| 6 | Not Defined | 1 Read |
| 5 | /PerrBlk_Q5 | Q-Channel Blocked Status of Sector 5 |
| 4 | /PerrBlk_Q4 | Q-Channel Blocked Status of Sector 4 |
| 3 | /PerrBlk_Q3 | Q-Channel Blocked Status of Sector 3 |
| 2 | /PerrBlk_Q2 | Q-Channel Blocked Status of Sector 2 |
| 1 | /PerrBlk_Q1 | Q-Channel Blocked Status of Sector 1 |
| 0 | /PerrBlk_Q0 | Q-Channel Blocked Status of Sector 0 |

FIG.12g

| Bit No. | Bit Name | Function ( 0 : Interrupt Status, 1 : Normal Status) |
|---|---|---|
| 7 | Not Defined | 1 Read |
| 6 | Not Defined | 1 Read |
| 5 | /Perr_I5 | Interrupt Generated on I-Channel of Sector 6 |
| 4 | /Perr_I4 | Interrupt Generated on I-Channel of Sector 4 |
| 3 | /Perr_I3 | Interrupt Generated on I-Channel of Sector 3 |
| 2 | /Perr_I2 | Interrupt Generated on I-Channel of Sector 2 |
| 1 | /Perr_I1 | Interrupt Generated on I-Channel of Sector 1 |
| 0 | /Perr_I0 | Interrupt Generated on I-Channel of Sector 0 |

FIG. 12h

| Bit No. | Bit Name | Function ( 0 : Interrupt Status, 1 : Normal Status) |
|---|---|---|
| 7 | Not Defined | 1 Read |
| 6 | Not Defined | 1 Read |
| 5 | /Perr_Q5 | Interrupt Generated on I - Channel of Sector 5 |
| 4 | /Perr_Q4 | Interrupt Generated on I - Channel of Sector 4 |
| 3 | /Perr_Q3 | Interrupt Generated on I - Channel of Sector 3 |
| 2 | /Perr_Q2 | Interrupt Generated on I - Channel of Sector 2 |
| 1 | /Perr_Q1 | Interrupt Generated on I - Channel of Sector 1 |
| 0 | /Perr_Q0 | Interrupt Generated on I - Channel of Sector 0 |

SWITCHING DEVICE IN DIGITAL UNIT OF MULTI-SECTOR BASE STATION

BACKGROUND OF THE INVENTION

1. Field of the Invention

The present invention relates to a switching device in a digital unit of a multi-sector base station in a code division multiple access (CDMA) mobile communication system, and more particularly to a switching device in a digital unit of a multi-sector base station, which switching device uses switching elements incorporated in the digital unit and adapted to switch 3 sectors into multiple sectors, thereby being capable of implementing a multi-sector base station system allowing a softer handoff among all sectors.

2. Description of the Related Art

Recently, it has been generalized to use, rather than mono media consisting of single media, a plurality of mono media, by virtue of continued developments in performances of representation media, transfer media, and operating systems thereof, as well as continued developments in data compression techniques for storage media and transfer media. For this reason, future radio communication systems must support high-speed multimedia services associated with not only audio data, but also high-speed data and image data. In order to allow radio communication systems to accommodate high-speed multimedia services, it is, first of all, necessary to provide radio channels of a large capacity because those radio communication systems have limited frequency resources. For this reason, introduction of the concept of micro cells, which have a cell radius of several hundred meters, or pico cells, which have a cell radius of several ten meters, has been highlighted in order to efficiently reuse limited frequency resources.

In the case of micro cell systems, however, there may be a problem in that since those micro cell systems have a cell size considerably smaller than those of macro cell systems, handoff occurs frequently between adjacent base stations, thereby resulting in a degradation in speech quality. Handoff occurring between adjacent base stations in a cellular system is called "soft handoff". This soft handoff is conducted using channel resources allocated to both base stations, thereby resulting in a waste of channel resources. Furthermore, a lengthened period of time is taken to process handoff because it is necessary to establish a channel for a new base station. On the other hand, "softer handoff" is a handoff occurring between adjacent sectors in a 3-sector base station. Accordingly, it is unnecessary to allocate additional channel elements (CEs). Also, a reduce handoff time is taken for the softer handoff, as compared to the soft handoff. In order to implement a micro cell system using a plurality of micro cells, therefore, it is necessary to design that system in such a fashion that softer handoff is made between adjacent cells. It is also necessary to develop a system capable of managing a plurality of cells in a centralized fashion.

A multi-sector base station system is a base station system capable of satisfying the above mentioned requirements.

Conventional base station systems are configured to have a maximum of three sectors. For this reason, a multi-sector base station system having a multi-sector configuration has been implemented using a plurality of 1FA 3-sector base station systems having the same FA.

FIG. 1 is a block diagram illustrating the case in which a 6-sector base station system is implemented using two conventional 1FA 3-sector base station systems.

As shown in FIG. 1, the 6-sector base station system includes a base station controller (BST) 10, a base station interconnection network (BIN) 20 for conducting a data interface with respect to the base station controller 10, and a base station control processor (BCP) 30 for controlling the overall operation of the base station controller 10. The system also includes a pair of 3-sector digital units, that is, a first 3-sector digital unit 40 and a second 3-sector digital unit 50, for processing and interfacing data between the base station controller 10 and each of sectors 81 to 86, a radio frequency unit (RU) 60 connected to both the first and second digital units 40 and 50 and adapted to process transmission and reception radio frequency signals, and a transmission medium (TM) 70 arranged between the radio frequency unit 60 and the sectors 81 to 86 and adapted to conduct a signal interconnection between the radio frequency unit 60 and the sectors 81 to 86.

The first digital unit 40 includes at least one shelf control and routing card assembly (SRCA) 41 for interfacing with the base station interconnection network 20, transmitting/receiving packet data of the digital unit 40, and collecting information about the status of the digital unit 40, at least one CDMA digital channel card assembly (CDCA) 42 for processing a CDMA digital signal, and at least one baseband and intermediate frequency conversion card assembly 43 (BICA) 43 arranged between the CDMA digital channel card assembly 42 and the RF unit 60 and adapted to conduct a digital interface with respect to the CDMA channel card assembly 42 while providing an interface with respect to the RF unit 60 at an intermediate frequency (IF) of 4.95 MHz.

Similarly to the first digital unit 40, the second digital unit 50 includes at least one shelf control and routing card assembly 51, at least one CDMA digital channel card assembly 52, and at least one baseband and IF conversion card assembly 53.

Each of the CDMA channel card assemblies 42 and 52 includes a controller and input/output (I/O) unit for conducting control and input/output operations, and 12 cell site modems (CSMs).

Practically, there are a plurality of shelf control and routing card assemblies 51 in one digital unit. Similarly, 10 CDMA channel card assemblies 52 are provided for one digital unit. There are also 3 baseband and IF conversion card assemblies 53 in one digital unit.

In the above mentioned conventional case, a multi-sector base station system, namely, a 6-sector base station system, is implemented by simply coupling together two conventional 3-sector base station systems having the same FA.

That is, the first digital unit 40 covers the sectors 81 to 83 whereas the second digital unit 40 covers the sectors 84 to 86. Accordingly, where a mobile station moves about within a zone covering the sectors 81 to 83 or within a zone covering the sectors 81 to 83, a softer handoff occurs. However, where a mobile station moves between the zone covering the sectors 81 to 83 and the zone covering the sectors 84 to 86, a soft handoff occurs. When a soft handoff occurs, it is possible to avoid a speech cut-off phenomenon because prior to a disconnection from the current base station, the mobile station is allocated with the channel element of a new base station so as to keep speech communications with the counterpart. In this case, however, a lengthened handoff processing time is taken. Furthermore, the efficiency of using channel resources is degraded because two channel elements are consumed.

Moreover, it is impossible to allocate idle channel elements, present in the first digital unit 40, for the sectors 84 to 86 covered by the second digital unit 50. Similarly, it is impossible to allocate idle channel elements, present in the second digital unit 50, for the sectors 81 to 83 covered by the first digital unit 40. For this reason, there is a problem in association with a flexible allocation of channel elements in the setting of a traffic channel.

As well known, conventional multi-sector base station systems have an advantage in that it is possible to implement a multi-sector base station system without any substantial hardware or software modification, in particular, in the case in which two 1FA 3-sector systems having the same FA are used.

However, there is a drawback in that increased costs are imposed for the construction of a desired system because a plurality of system units should be used. As mentioned above, there are also drawbacks of a lengthened handoff processing time and a degraded channel resource using efficiency because the soft handoff is made between 3-sector digital units. In addition, where a 6-sector BTS system is configured using two 3-sector 1FA digital unit shelves, there are drawbacks in that the area occupied by one base station device and the financial burden is increased because it is necessary to always use two 3-sector digital units for one base station device.

SUMMARY OF THE INVENTION

Therefore, an object of the invention is to solve the problems involved when a multi-sector (6-sector) base station system is configured using two conventional 1FA 3-sector base station systems having the above mentioned configuration, and to provide a switching device in a digital unit of a multi-sector base station, which switching device uses switching elements incorporated in the digital unit and adapted to switch 3 sectors into multiple sectors, thereby being capable of implementing a multi-sector base station system allowing a softer handoff among all sectors.

Another object of the invention is to provide a switching device in a digital unit of a multi-sector base station, which switching device uses switching elements adapted to support the switching of the next channel element stage in the digital unit included in the existing 3-sector base station to implement a base station system, thereby allowing all handoff between sectors to be conducted in a softer handoff fashion while allowing all channel elements to be set for all sectors covered by the base station upon setting a traffic channel, thereby achieving an efficient allocation of channel elements.

In accordance with the present invention, a 6-sector base station system is efficiently implemented in accordance with the setting of a timing capable of supporting an addition of switching elements, an operation of switching elements upon setting pilot, sync, and access channels, and an operation of switching elements upon a handoff and call setting.

In other words, there is a fundamental difficulty in implementing a multi-sector system capable of supporting a softer handoff between sectors in that channel elements are designed only to support a maximum of 3 sectors. In accordance with the present invention, switching elements are designed in order to allow data of a channel element, adapted to support only the existing α, β, γ-sectors, to be switched to further sectors while allowing data from multiple sectors more than 3 sectors to be switched to 3 sectors. By virtue of such a design, a multi-sector base station system is implemented.

BRIEF DESCRIPTION OF THE DRAWINGS

The above objects, and other features and advantages of the present invention will become more apparent after a reading of the following detailed description when taken in conjunction with the drawings, in which:

FIG. 12$a$ is a table illustrating the parameters of an internal function register included in each switching element of FIG. 3;

FIG. 12$b$ is a table illustrating operation parameters in a first switch controller included in each switching element;

FIG. 12$c$ is a table illustrating operation parameters in a second switch controller included in each switching element;

FIG. 12$d$ is a table illustrating the parameters of a mode execution control register included in each switching element;

FIG. 12$e$ is a table illustrating the parameters of an I-channel block status register included in each switching element;

FIG. 12$f$ is a table illustrating the parameters of a Q-channel block status register included in each switching element;

FIG. 12$g$ is a table illustrating the parameters of an I-channel block status register included in each switching element; and FIG. 12$h$ is a table illustrating the parameters of a Q-channel block status register included in each switching element.

DESCRIPTION OF THE PREFERRED EMBODIMENTS

Hereinafter, preferred embodiments of the present invention will be described in detail.

Figure 1:
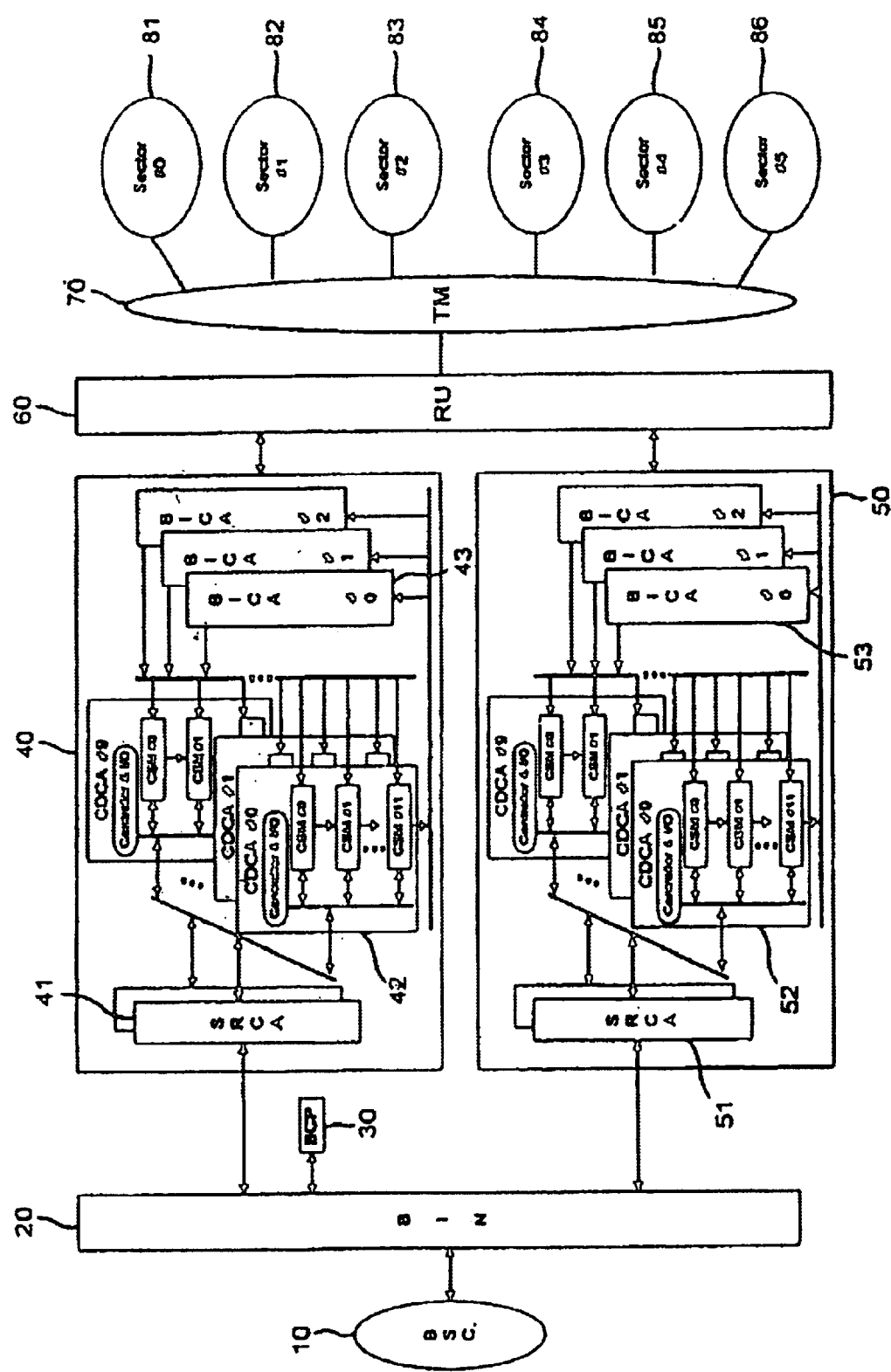
FIG. 1 is a block diagram illustrating the case in which a 6-sector base station system is implemented using conventional 1FA 3-sector base station systems.
Figure 2:
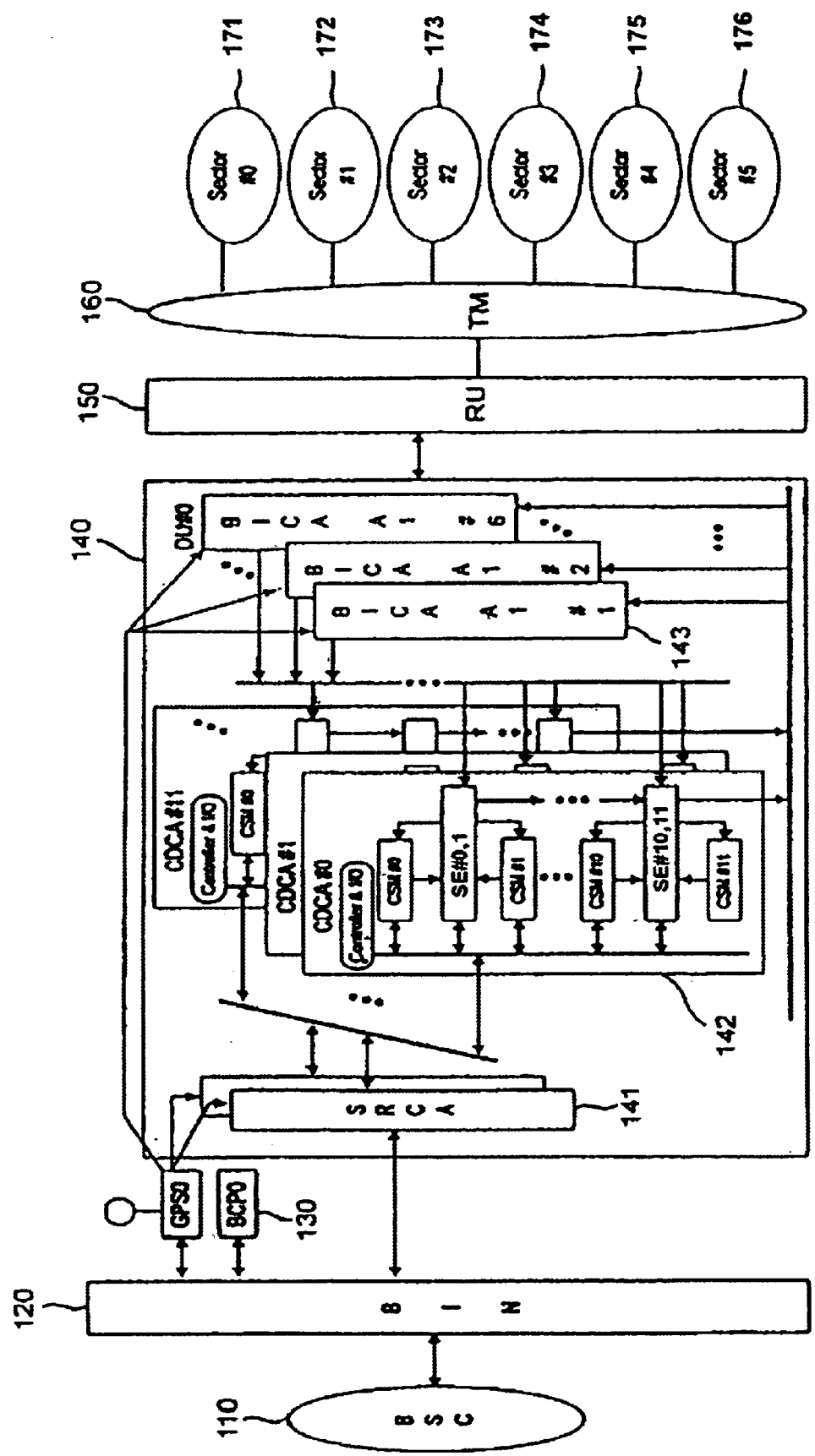
FIG. 2 is a block diagram illustrating a multi-sector base station system including switching elements (SEs) according to the present invention.

FIG. 2 is a block diagram illustrating a multi-sector base station system including switching elements (SEs) according to the present invention.

As shown in FIG. 2, the multi-sector base station system includes a base station controller (BST) 110 for controlling base stations, a base station interconnection network (BIN) 120 for providing an interface between base stations, and a base station control processor (BCP) 130 for controlling the overall operation of the multi-sector base station system. The system also includes a digital unit 140 for processing forward and reverse link signals obtained from the base station controller 110, a radio frequency unit (RU) 150 connected to the digital unit 140, and a transmission medium (TM) 160 adapted to interface signals between the RF unit 150 and six sectors 171 to 176.

The digital unit 140 includes at least one shelf control and routing card assembly (SRCA) 141 for interfacing with the base station interconnection network 120, transmitting/receiving packet data of the digital unit 140, and collecting information about the status of the digital unit 140. The digital unit 140 also includes at least one CDMA digital channel card assembly (CDCA-SE) 142 for processing a CDMA digital signal, and at least one baseband and intermediate frequency conversion card assembly (BICA) 143 arranged between the CDMA digital channel card assembly 142 and the RF unit 150 and adapted to conduct a digital interface with respect to the CDMA channel card assembly 142 while providing an interface with respect to the RF unit 140 at an intermediate frequency (IF) of 4.95 MHz. In the illustrated case, the digital unit 140 includes a plurality of shelf control and routing card assemblies 141, a plurality of CDMA channel card assemblies 142, and a plurality of baseband and IF conversion card assemblies 143.

In the digital unit 140, each shelf control and routing card assembly 141 receives control and traffic HDLC packets outputted from the base station connection network 120 in a forwardly linked status, filters those, associated with the digital unit 140, from the received packets, and carries the filtered packets on a multi-drop bus. As a result, each CDMA channel card assembly 142 receives only packets, associated therewith, from the multi-drop bus. Cell site modems (CSMs) included in each CDMA channel card assembly 142 process traffic and control data in accordance with a base station forward channel scheme of "J-STD-008", thereby generating digitally modulated data. The modulated data outputted from respective cell site modems of each CDMA channel card assembly 142 are transmitted to an associated one of the baseband and IF conversion card assemblies 143 in the form of a transmission data stream. Each baseband and IF conversion card assembly 143 conducts a digital addition of forward digital signals corresponding to an associated one of the sectors, converts the resultant signal into an analog signal, and QPSK-modulates the analog signal, thereby outputting a signal having an intermediate frequency of 4.95 MHz.

When each baseband and IF conversion card assembly 143 receives an IF signal of 4.95 MHz from the RF unit 150 in a reversely linked status, it conducts an automatic gain control (AGC) and a QPSK demodulation for the received IF signal, thereby converting the IF signal into a baseband signal. This baseband signal is then converted into a digital signal, that is, digital sample data. The baseband and IF conversion card assembly 143 transmits the digital sample data to an associated one of the CDMA channel card assemblies 142 via a multi-drop line. The cell site modem of the CDMA channel card assembly 142 conducts a CDMA digital demodulation for the digital samples, thereby creating data corresponding to information about an associated user. The created data is sent to a processor, for example, a model i960 manufactured by Intel Corporation. An HDLC controller included in the processor reads the data, thereby producing an HDLC packet which is, in turn, carried on a transmission multi-drop bus. This transmission multi-drop bus is connected to the base station interconnection network 120 via the shelf control and routing card assemblies 141. Simultaneously with the transmission of the HDLC packet, transmission and reception of control and status packets are also carried out via the shelf control and routing card assemblies 141.

Meanwhile, where a 6-sector base station system is implemented using switching elements, as mentioned above, there are requirements for the operation of 6-sector base stations.

In conventional systems, base station configurations have been used which are defined as "Omni", "Omni-Outdoor", "Sector", and "Sector-Outdoor". However, the 6-sector base station system should use new base station configurations different from those in conventional systems. In other words, it is necessary to add information about configurations newly added. In this regard, new configuration information entitled "sector 6_BTS" is added in accordance with the present invention. Also, extended sector IDs having values of 0 to 5 are used.

In order to meet the IS-95 Standard, base stations should transmit forward data streams in a state aligned with a universal time. Forward channels involve the following delays:

$T_{pp2s\_dly}$: Delay of an even second clock inputted to a PP2S pin of a cell site modem (CSM)1.0 chip with respect to universal time;

$T_{mod\_dly}$: Processing delay of the CSM1.0 chip; and $T_{dist\_dly}$: Delay of the output from the CSM1.0 chip occurring when the output is actually broadcasted via an antenna.

Thus, the total delay occurring on a forward channel corresponds to the sum of the above mentioned delays, that is, $$"T_{pp2s\_dly} + T_{mod\_dly} + T_{dist\_dly}".$$

In order to compensate for such a delay, each cell site modem transmits forward input data at the point of time advanced by the total delay time. For the compensation for the delay, each cell site modem chip includes the following registers:

TX_PCG_ADV(6 bit): This register serves to advance the timing of an encoder by power control groups (1.25 ms). This register can advance the timing of the encoder by a maximum of 80 ms to 8 Pn chips.;

TX_8CHIP_ADV (8 bit): This register serves to advance the timing of the encoder by 8 pin chips (6.51 $\mu$s). This register can advance the timing of the encoder by a maximum of one power control group (PCG) to 8 PN chips.;

Sn_CHIPX2_ADV (10 bit): This register serves to advance the timing of 3 sectors α, β, and γ in the cell site modem by ½ PN chips (4.07 $\mu$s).; and TX-PHASE (2 bit): This register serves to advance the timing of a transmission section by ⅛ PN chips (0.10 $\mu$s). This register can advance the timing of the transmission section by a maximum of a ⅜ PN chip.

Delay measurement and setting of each timing register for the timing advance are carried out as follows:

1) The delay $T_{dist\_dly}$ of the final output from the final switching element block, connected to the BICA, to the antenna is measured at intervals of a ⅛ PN chip.

2) The processing delay of the cell site modem chip and the processing delay of the switching element chip are measured at intervals of a ⅛ chip. The measured processing delays are added together, and the resultant value is set to the delay $T_{mod\_dly}$. Where the cell site modem and the switching element chip are those of the n-th stage, the processing delay $T_{mod\_dly}$ corresponds to $n*T_{mod\_dly}$ ($T_{mod\_dly}=n*T_{mod\_dly}$).

3) The delay $T_{pp2s\_dly}$" is measured at intervals of a ⅛ chip.

4) Respective natural values of all delays are added together, thereby deriving the total delay value "$T_{pp2s\_dly}+T_{mod\_dly}+T_{dist\_dly}$") (at intervals of a ⅛ chip).

5) The total delay value is derived at intervals of 1 PCG (1.25 ms). The derived total delay value is set in the register TX_PCG_ADV. The modulo less than 1 PCG is set in the register TX_8CHIP_ADV.

6) The lower 10 bits of the total delay value are taken at intervals of a ½ PN chip. The derived value is set in the register SN_CHIP_ADV.

7) The lower 2 bits of the total delay value are set in the register TX_PHASE.

Where the 6 sectors have the same forward transmission path, the above mentioned first through seventh processes are conducted only in an initialization procedure. On the other hand, where the 6 sectors have different forward transmission paths, respectively, the first through seventh processes are conducted not only in the initialization procedure, but also every time a call setting, a handoff addition, or a handoff swapping is made, and before an associated switching element control command is generated.

In addition, it is required to change the transmission mode of the cell site modem.

In a conventional 3-sector channel card assembly, channel elements are connected together in a cascade fashion with respect to forward data. In this case, each channel element is changed in mode from a normal mode to a forward transmission mode. In the normal mode of each channel element, the data of the channel element is combined with forward data transmitted from the preceding channel element.

In the channel card assembly according to the present invention, however, a switching element is connected to the output of each channel element in such a fashion that a 3-sector signal is switched into a 6-sector signal. In a digital summer included in the switching element, the 6-sector signal is summed with a 6-sector signal transmitted from the preceding switching element. Thus, it is unnecessary to use the summer included in the cell site modem. In order to support such an arrangement, each channel element should be set in order to transmit only data transmitted thereto from a central processing unit (CPU). In other words, the third bit "TX_SUM_NORMAL" of the register SUMMER_CTL arranged at an address 68h in the cell site modem chip is set to "0".

Also, particular methods for operating the switching element are required in association with overhead channel setting, outgoing/incoming calls, and handoff, respectively.

Figure 4:
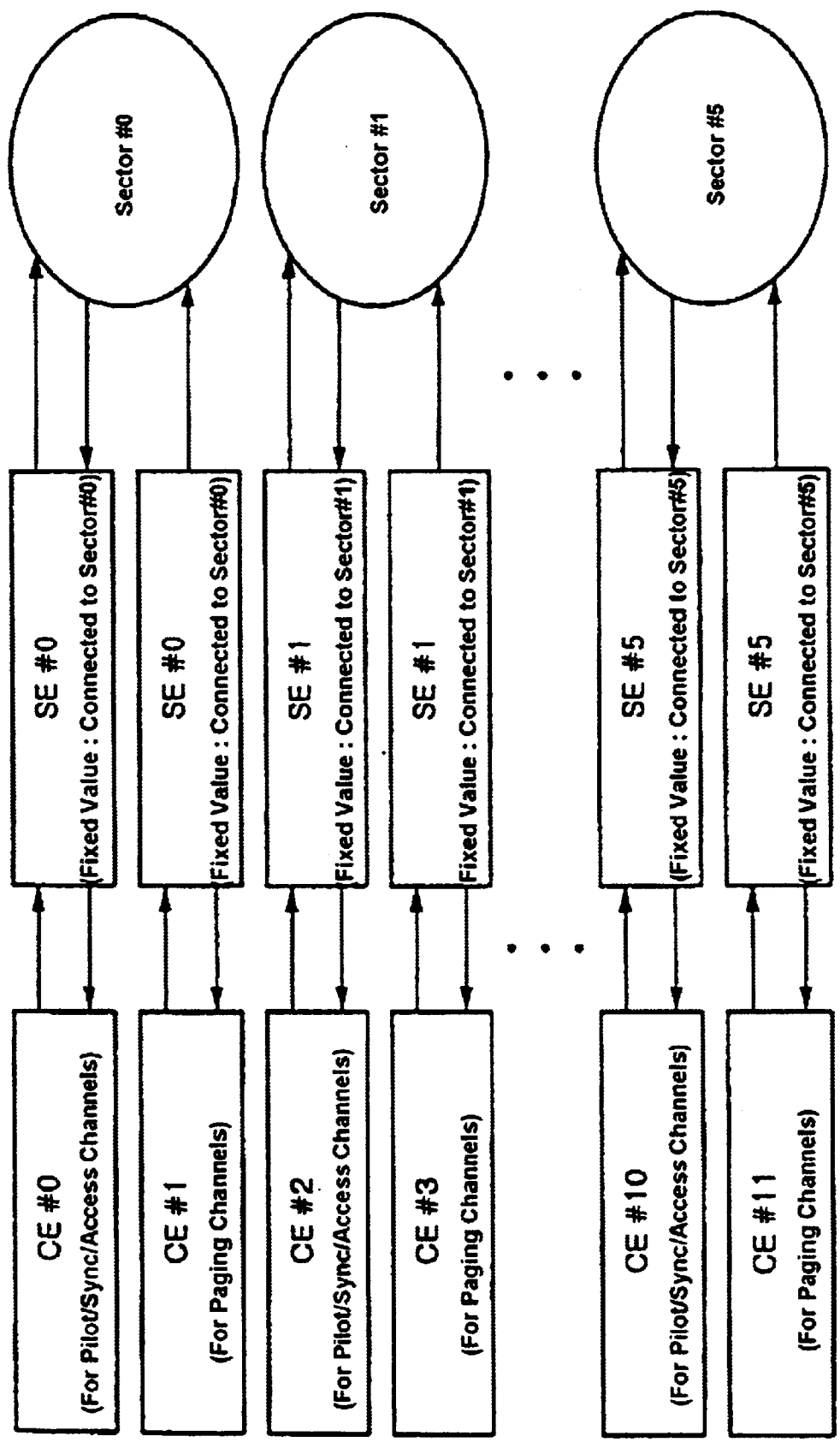
FIG. 4 is a diagram illustrating connections of the switching elements applied to the configuration of FIG. 2 with pilot, sync, access, and paging channels.

For the signaling associated with the call setting, handoff, and position registration, one or more pilot, sync, access, and paging channels should be allocated for every multi-sector. The pilot/sync/access channels can be allocated using one channel element. However, the paging channels can be allocated using separate channel elements, respectively. Since each of these channels should be fixed at least one for each multi-sector, fixed switching values are simply set in each switching element upon initializing the system. It is unnecessary to vary those fixed switching values during the operation of the system. Where the multi-sector base station system has the configuration having 6 sectors, as shown in FIG. 2, channel elements are allocated one per sector for the pilot/sync/access channels while being allocated at least one per sector for the paging channels. In this case, each switching element, which serves to switch data of an associated channel element, is set as shown in FIG. 4.

Signals transmitted on the pilot, sync, access, and paging channels are processed using the same method as that in the conventional 3-sector base station system, except that the sector IDs are extended to have values of 0 to 5. In the conventional 3-sector base station system, sector IDs have values of 0 to 2.

Signal processing associated with traffic channels is carried out in accordance with the following method under the condition in which the sector IDs are also extended to have values of 0 to 5.

When the base station control processor 120 is to process an outgoing call, it can identify the sector where the mobile station is positioned, based on the ID of an access channel on which the call is received. Based on the identified sector, accordingly, the base station control processor 120 sets the sector ID field of a traffic channel assignment message tc_mob_assign_msg. The resultant message tc_mob_assign_msg is sent to the CDMA channel card assemblies 142. In response to the message tc_mob_assign_msg, the associated CDMA channel card assembly 142 sets the traffic channel. The CDMA channel card assembly 142 also applies a switching control command to the associated switching element in order to connect the set channel element to the associated sector.

On the other hand, when the base station control processor 120 sends a paging channel page message pc_page_mob_msg to the CDMA channel card assembly 142 upon processing an incoming call, the CDMA channel card assembly 142 transmits, in response to the message pc_page_mob_msg, a page message page_msg to the mobile station. In response to the message mage_msg, the mobile station sends a page response message page_response_msg to the CDMA channel card assembly 142 which, in turn, transmits a page response cc_cai_page_resp to the base station control processor 120.

Based on the ID of the access channel on which the page response cc_cai_page_resp is received, the base station control processor 120 can identify the sector where the mobile station is positioned. Based on the identified sector, accordingly, the base station control processor 120 sets the sector ID field of a traffic channel assignment message tc_mob_assign_msg. The resultant message tc_mob_assign_msg is sent to the CDMA channel card assemblies 142. In response to the message tc_mob_assign_msg, the associated CDMA channel card assembly 142 sets the traffic channel. The CDMA channel card assembly 142 also applies a switching control command to the associated switching element in order to connect the set channel element to the associated sector.

During the addition and swapping procedures for softer, soft, and hard handoffs, the base station control processor 120 instructs the CDMA channel card assembly 142 to set a traffic channel, using the traffic channel assignment message tc_mob_assign_msg. Based on this message, the CDMA channel card assembly 142 sets a traffic channel, and connects the switching element to an added sector.

Heretofore, the change of the base station configuration information associated with the designing of a 6-sector base station has been described. Now, the configuration and operation of the switching element proposed in accordance with the present invention will be described. In accordance with the present invention, the switching element has functions of receiving forward data from two channel elements each configured for 3 sectors, switching the received forward data into 6 signals for respective 6 sectors, summing each of the 6 signals with a forward signal outputted from the preceding switching element, and outputting the resultant signals, while switching reverse data, received from the 6 sectors, into 3-sector signals in accordance with a control command from the controller of the associated CDMA channel card assembly 142, and outputting the resultant signal to the two channel element.

The control command is set by the set values of switching control registers included in the switching element. The setting of the switching control registers is shown in FIGS. 12a to 12h.

When a parity error is generated, this value is stored in a parity status register. Simultaneously, a parity interrupt is generated. The central processing unit, that is, the controller of the CDMA channel card assembly 142, is informed of the parity interrupt generation. Once a parity interrupt is generated, it is recognized by the central processing unit. This central processing unit maintains the recognized value until the value is cleared. Therefore, the parity interrupt should be cleared from the central processing unit. This is possible by writing "Don't care" data in the switching element at an address 03H. In FIG. 12a, the signal P_int_Clr represents a parity interrupt clear signal (Write, Only, Address: 03H) for clearing the parity interrupt value from the central processing unit.

FIG. 12a illustrates the parameters of an internal function register included in the switching element. FIG. 12b illustrates operation parameters in a first switch controller. FIG. 12c illustrates operation parameters in a second switch controller. FIG. 12d illustrate the parameters of a mode execution control register. FIG. 12e illustrate the parameters of an I-channel block status register. FIG. 12f illustrate the parameters of a Q-channel block status register. FIG. 12g illustrate the parameters of an I-channel block status register. FIG. 12h illustrates the parameters of a Q-channel block status register.

Inputs and outputs of the switching element and the configurations of the registers included in the switching element will now be described.

The switching element have 187 input/output pins which are classified, in terms of functions, as follows:

a. Control pins: address0 to address3, /CS (Chip Select), /RD (Read), /WR (Write), Data0 to Data7, P_int0, and Pint1;

b. Clock pins: Sys-clk, and Even-clk;

c. Forward data pins:
1) Forward data input pins from two cell site modems (I, Q, Even, and Odd for every 3 sectors),
AIFw[1 . . . 0] [1 . . . 0], AQFw[1 . . . 0] [1 . . . 0]
BIFw[1 . . . 0] [1 . . . 0], BQFw[1 . . . 0] [1 . . . 0]
GIFw[1 . . . 0] [1 . . . 0], GQFw[1 . . . 0] [1 . . . 0]
2) Forward data input pins from the switching element of the preceding stage (I, Q, Even, Odd for every 6 sectors),
S0IPr[1 . . . 0], S0QPr[1 . . . 0]
S1IPr[1 . . . 0], S1QPr[1 . . . 0]
S2IPr[1 . . . 0], S2QPr[1 . . . 0]
S3IPr[1 . . . 0], S3QPr[1 . . . 0]
S4IPr[1 . . . 0], S4QPr[1 . . . 0]
S5IPr[1 . . . 0], S5QPr[1 . . . 0]
3) Forward data output pins
S0IFw[1 . . . 0], S0QFw[1 . . . 0]
S1IFw[1 . . . 0], S1QFw[1 . . . 0]
S2IFw[1 . . . 0], S2QFw[1 . . . 0]
S3IFw[1 . . . 0], S3QFw[1 . . . 0]
S4IFw[1 . . . 0], S4QFw[1 . . . 0]
S5IFw[1 . . . 0], S5QFw[1 . . . 0]

d. reverse data pin
1) Reverse input pins from the BICA (I and Q for every 6 sectors),
S0IRv[3 . . . 0], S0QRv[3 . . . 0]
S1IRv[3 . . . 0], S1QRv[3 . . . 0]
S2IRv[3 . . . 0], S2QRv[3 . . . 0]
S3IRv[3 . . . 0], S3QRv[3 . . . 0]
S4IRv[3 . . . 0], S4QRv[3 . . . 0]
S5IRv[3 . . . 0], S5QRv[3 . . . 0]
2) Reverse output pins from two cell site modems (I and Q for 3 sectors)
AIRv[1 . . . 0] [3 . . . 0], AQRv[1 . . . 0] [3 . . . 0]
BIRv[1 . . . 0] [3 . . . 0], BQRv[1 . . . 0] [3 . . . 0]
GIRv[1 . . . 0] [3 . . . 0], GQRv[1 . . . 0] [3 . . . 0]

Now, the switching element having the above mentioned input/output pin arrangement will be described.

Figure 3:
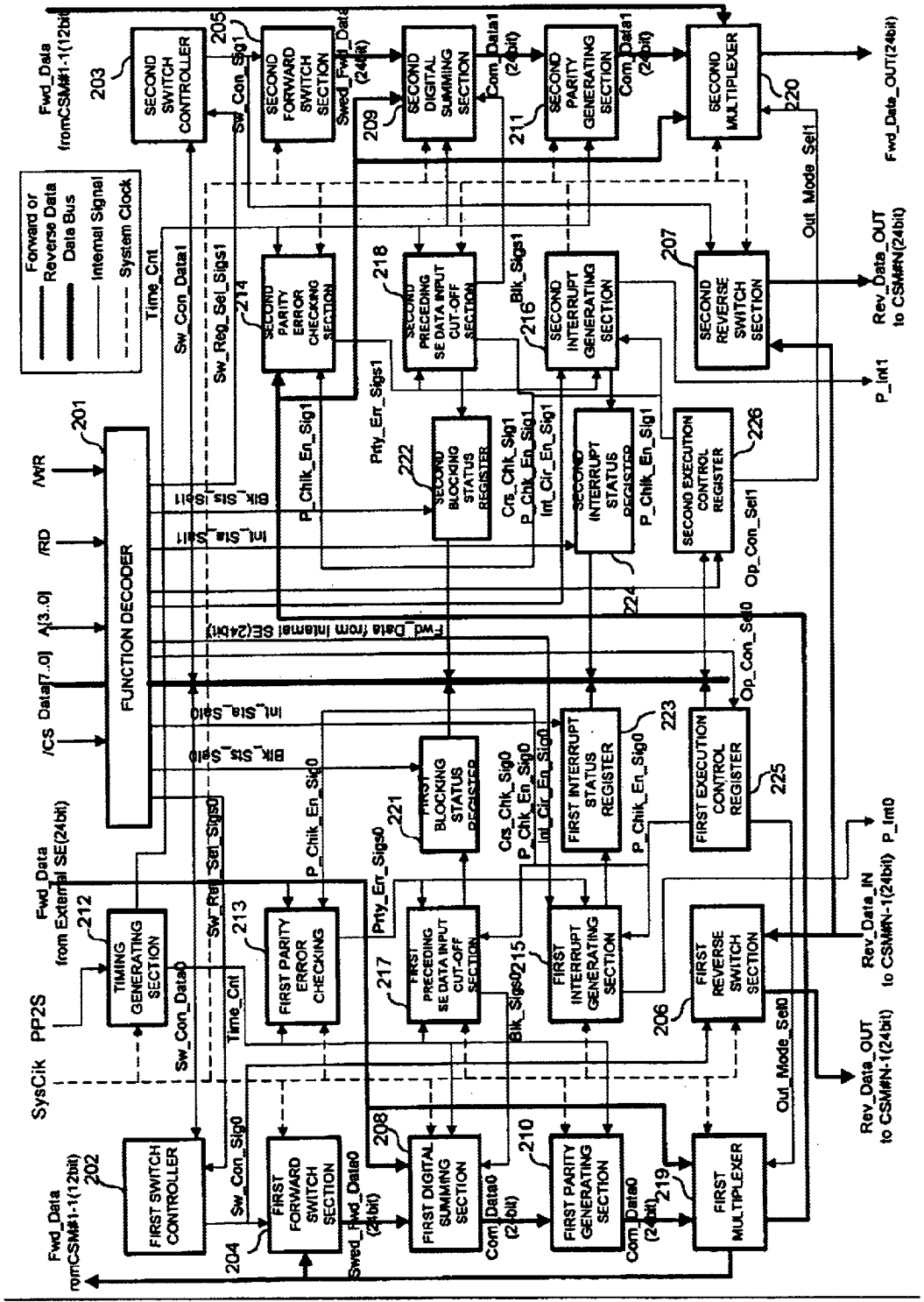
FIG. 3 is a block diagram illustrating a switching element in a digital unit of a multi-sector base station system in accordance with an embodiment of the present invention.

FIG. 3 is a block diagram illustrating a switching element in a digital unit of a multi-sector base station system in accordance with an embodiment of the present invention. The switching element includes a function decoder 201 which receives an address signal and write/read signal acquired from the controller of the CDMA channel card assembly, decodes the received signals, and transmits an enable signal to each block of the switching element, based on the decoding result. The switching element also includes a first switch controller 202 and a second switch controller 203, each of which serves to store the switch control command acquired from the CDMA channel card assembly via the function decoder 201, decodes the stored switch control command, and creates switch control signals, based on the decoding result, in order to control forward and reverse switches.

A pair of forward switches, that is, a first forward switch section 204 and a second forward switch section 205, serve to distribute 3-sector forward signals, respectively acquired from the two cell site modems, into 6-sector signals, in accordance with respective switch control signals outputted from the first and second switch controllers 202 and 203. A pair of reverse switches, that is, a first reverse switch section 206 and a second reverse switch section 207, are also provided, which serve to connect 6-sector reverse signals, received from the BICA, to the sectors of the 3-sector cell site modems, based on respective switch control signals outputted from the first and second switch controllers 202 and 203, respectively.

A pair of digital summing sections, that is, a first digital summing section 208 and a second digital summing section 209, add 6-sector data outputted from the first and second forward switch sections 204 and 205 to 6-sector data received from the preceding switching element stage, respectively. A first parity generating section 210 and a second parity generating section 211 check respective parities of forward data outputted from the first and second digital summing sections 208 and 209. Each of the first and second parity generating sections 210 and 211 inserts an odd parity into the last bit of each unit data.

The switching unit further includes a timing generating section 212 for generating a timing clock in response to every system clock in sync with an input even second clock, and transmitting the timing clock to each block. First and second parity error checking sections 213 and 214 check whether or not the parity of digital sum data transmitted from the preceding signal element is an odd parity. Where each of the parity error checking sections 213 and 214 determines the generation of a parity error, it activates a parity error signal. First and second interrupt generating sections 215 and 216 generate interrupt signals to the CDMA channel card assembly when parity errors are detected by the first and second parity error checking sections 213 and 214.

First and second preceding switching element data input cut-off sections 217 and 218 cut off the data outputted from the preceding switching element, in response to the generation of the parity errors, in order to prevent the data from being inputted to the first and second digital summing sections 208 and 209, respectively. First and second multiplexers 219 and 220 serve to multiplex respective forward data outputted from the first and second parity generating sections 210 and 220 with respective forward data outputted from the preceding switching element.

First and second block status registers 221 and 22 store respective data input cut-off status values outputted from the first and second preceding switching element data input cut-off sections 217 and 218. First and second interrupt status registers 223 and 224 store respective interrupt generation status values outputted from the first and second interrupt generating sections 215 and 216. First and second execution control registers 225 and 226 serve to store execution control select signals, respectively.

Since the switching element having the above mentioned configuration switches forward and reverse data between two cell site modems (CSM1.0) and performs a digital summing for those data, all blocks thereof, except for the timing generating section 212 and function decoder 201 serving to achieve the overall timing and control of the switching element, are configured in pair so that the blocks of each block pair process respective inputs from the cell site modems.

As mentioned above, in the switching element of the digital unit according to the present invention, the function decoder 201 receives an address signal and write/read signal outputted from the controller (i960) of the CDMA channel card assembly, decodes the received signals, and transmits an enable signal to each block of the switching element, based on the decoding result.

Enable signals transmitted from the function decoder 201 to respective blocks may include Sw_Reg_Sel_Sigs, Blk_Sts_Sel, Int_Sts_Sel, Op_Con_Sel, and Int_Clr_sig.

The signal Sw_Reg_Sel_Sigs is a signal which is activated when the controller writes switch control information in the switching element. The signal Blk_Sts_Sel is a signal which is activated when the controller reads the first and second blocking status registers 221 and 222. The signal Int_Sts_Sel is a signal which is activated when the controller writes mode setting data in the first and second execution control registers 225 and 226 in order to set the mode of the switching element. The signal Int_Clr_sig is a signal which is activated when the controller clears the interrupt generated.

The timing generating section 212 generates a timing signal Time_Cnt in response to every 8 system clocks with reference to input even second clocks, and transmits the timing signal Time_Cnt to blocks requiring that timing signal. Accordingly, the operations of all blocks in the switching element are conducted with reference to even seconds. This is because input data packets are configured to be aligned together with reference to even second clocks. Thus, one unit data is transmitted at every 8 system clocks with reference to asserted even second clocks. Therefore, it is necessary to provide a function for providing a reference capable of determining which bit of the data packet corresponds to the bit currently transmitted. This function is carried out by the timing generating section 212. The timing generating section 212 may be simply implemented using a modulo-8 counter which increments its counted value at every system clock in sync with an odd second clock.

Meanwhile, when the first and second switch controllers 202 and 203 receive the switch control information outputted from the function decoder 201, they store the received switching information, and decode the stored value, thereby creating a switch control signal Sw_Con_Sig. This switch control signal Sw_Con_Sig is used to control the first and second forward switch sections 204 and 205 and the first and second reverse switch sections 206 and 207.

Figure 5:
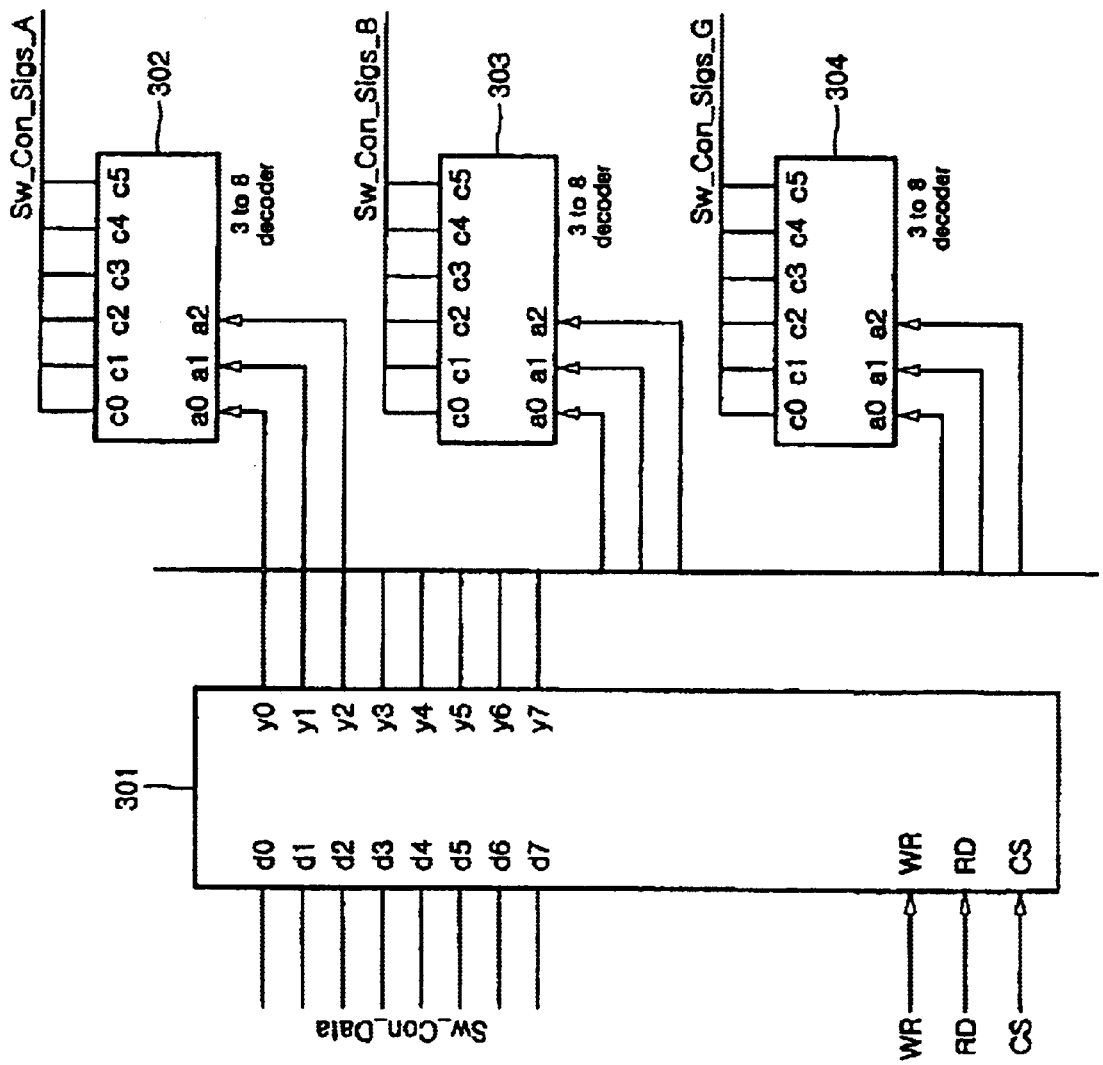
FIG. 5 is a circuit diagram illustrating each of first and second switch controllers, shown in FIG. 3, in accordance with an embodiment of the present invention.

As shown in FIG. 5, each of the first and second switch controllers 202 and 203 includes a latch 301 for latching switch control information Sw_Con_Data, received thereto, in accordance with a write signal WR, a read signal RD, and a chip select signal CS outputted from the function decoder 201, and first through third decoders 302 to 304 for generating first through third control signals Sw_Con_Sigs_A, Sw_Con_Sigs_B, and Sw_Con_Sigs_G, previously stored, in accordance with an output signal from the latch 301.

Each of the first and second switch controllers 202 and 203 having the above mentioned configuration latches the switch control information, received from the function decoder 201, by the latch 301. The first through third decoders 302 to 304 receive 3 bits of an output signal from the latch 301 as input signals, respectively. In response to the input signal, each decoder outputs one of 8 switch control signals previously stored. In this case, each of the first through third decoders 302 to 304 is implemented using a 3:8 decoder. The output signals from the first through third decoders 302 to 304 each decoder are used as switch control signals for respective sectors.

In accordance with the switch control signals outputted from the first and second switch controllers 202 and 203, the first and second forward switch sections 204 and 205 distribute 3-sector forward signals, received from respective cell site modems, into 6-sector signals which are, in turn, transmitted to the first and second digital summing sections 208 and 209 respectively arranged downstream from the first and second forward switch sections 204 and 205.

Figure 6:
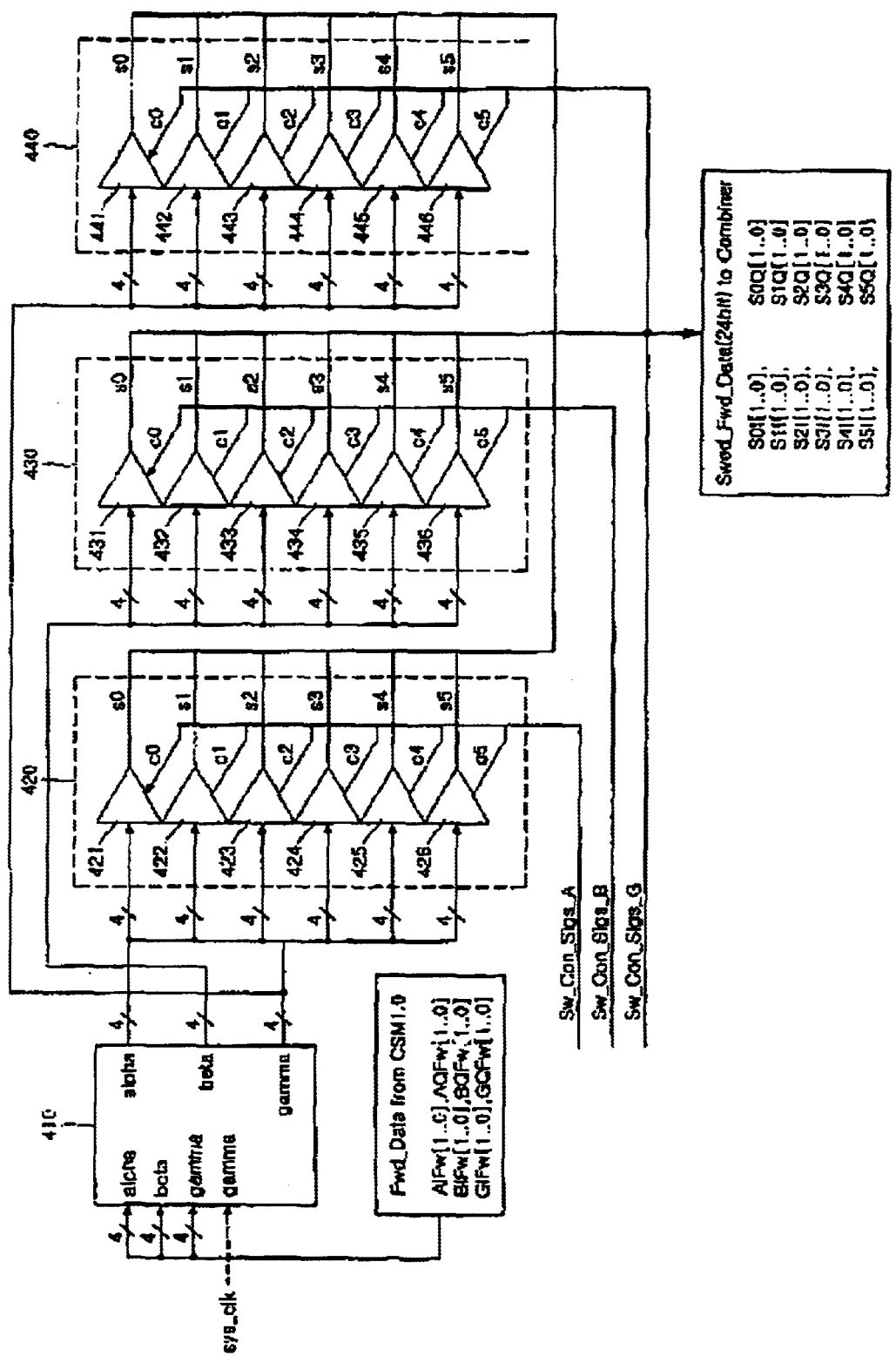
FIG. 6 is a circuit diagram illustrating each of first and second forward switch sections, shown in FIG. 3, in accordance with an embodiment of the present invention.

As shown in FIG. 6, each of the first and second forward switch sections 204 and 205 includes a latch 410 for latching 3-sector forward data (4 bits for each sector), outputted from an associated one of the cell site modems, in sync with an input system clock, and a first buffer section 420 for buffering 4-bit α-sector data, included in output data from the latch 410, in accordance with α-sector switch control signal Sw_Con_Siga_A included in the switch control signal outputted from an associated one of the first and second switch controllers 202 and 203, thereby outputting 6-sector signals s0 to s5. The first or second forward switch section 204 or 205 also includes a second buffer section 430 for buffering 4-bit β-sector data, included in the output data from the latch 410, in accordance with β-sector switch control signal Sw_Con_Siga_B included in the switch control signal outputted from the associated first or second switch controller 202 or 203, thereby outputting 6-sector signals s0 to s5, and a third buffer section 440 for buffering 4-bit γ-sector data, included in the output data from the latch 410, in accordance with γ-sector switch control signal Sw_Con_Siga_G included in the switch control signal outputted from the associated first or second switch controller 202 or 203, thereby outputting 6-sector signals s0 to s5.

The first buffer section 420 includes first through six 3-status buffers 421 to 426 each adapted to distribute an input 4-bit α-sector signal into a 6-sector signal. The second buffer section 430 includes first through six 3-status buffers 431 to 436 each adapted to distribute an input 4-bit β-sector signal into a 6-sector signal. The third buffer section 440 includes first through six 3-status buffers 441 to 446 each adapted to distribute an input 4-bit γ-sector signal into a 6-sector signal.

Each of the first and second forward switch sections 204 and 205 having the above mentioned configuration latches 3-sector forward data, inputted by 4 bits for each sector, in sync with the system clock applied to the clock terminal thereof, by the latch 410.

The 4-bit data, corresponding to the α sector, of the latched 3-sector signal is inputted to the first buffer section 420. The 4-bit data, corresponding to the β sector, of the latched 3-sector signal is inputted to the second buffer section 430. On the other hand, the 4-bit data, corresponding to the γ sector, of the latched 3-sector signal is inputted to the third buffer section 440.

The first buffer section 420 then buffers the received data in accordance with the α-sector switch control signal Sw_Con_Siga_A included in the switch control signal outputted from an associated one of the first and second switch controllers 202 and 203, thereby outputting 6-sector signals s0 to s5.

Similarly, the second buffer section 430 buffers the received data in accordance with the β-sector switch control signal Sw_Con_Siga_B included in the switch control signal outputted from the associated first or second switch controller 202 or 203, thereby outputting 6-sector signals s0 to s5.

Also, the third buffer section 440 buffers the received data in accordance with the γ-sector switch control signal Sw_Con_Siga_G included in the switch control signal outputted from the associated first or second switch controller 202 or 203, thereby outputting 6-sector signals s0 to s5.

Subsequently, each of the first and second digital summing sections 208 and 209 adds the 6-sector data outputted from an associated one of the first and second forward switch sections 204 and 205 to the 6-sector data received from the preceding switching element, and outputs the resultant data.

Figure 8:
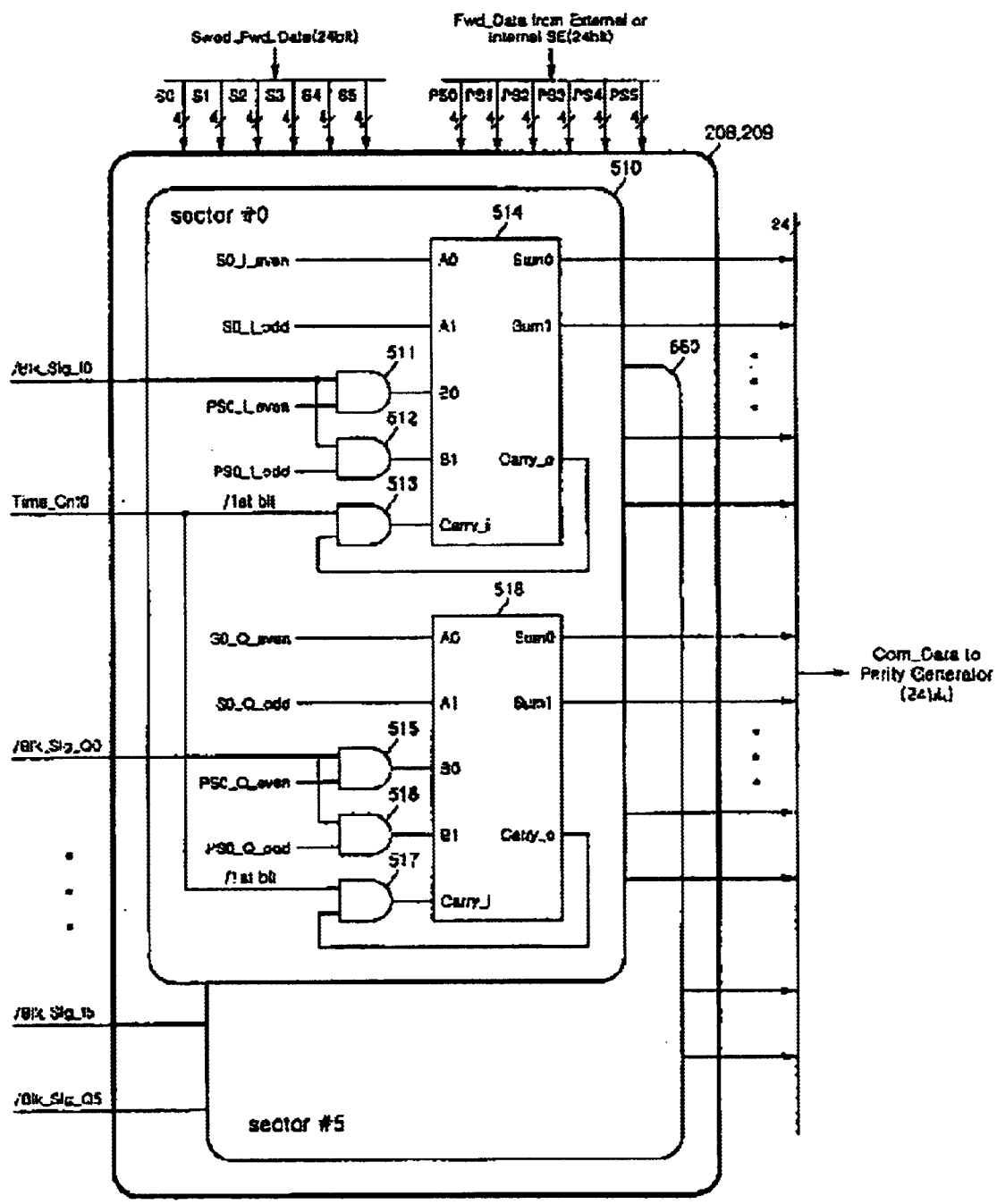
FIG. 8 is a circuit diagram illustrating each of first and second digital summing sections, shown in FIG. 3, in accordance with an embodiment of the present invention.

As shown in FIG. 8, each of the first and second digital summing sections 208 and 209 includes 6 1-sector summers 510 to 560. Each of the 1-sector summers, for example, the first 1-sector summer 510, includes a first AND gate 511 for ANDing an I-channel blocking signal/Blk_Sig_I0 with first-sector I-channel even data PS0_I_even outputted from the other switching element, a second AND gate 512 for ANDing the I-channel blocking signal/Blk_Sig_I0 with first-sector I-channel odd data PS0_I_odd outputted from the other switching element, a third AND gate 513 for ANDing an input timing signal with its carry-out signal carry_o, a first full adder 514 for receiving an output signal from the third AND gate 513 as a carry-in signal carry_i, adding an output signal from the first AND gate 511 to the first-sector I-channel even data included in the 6-sector forward data received thereto, outputting the resultant added value, adding an output signal from the second AND gate 512 to the first-sector I-channel odd data included in the 6-sector forward data received thereto, and outputting the resultant added value, a fourth AND gate 515 for ANDing a Q-channel blocking signal/Blk_Sig_Q0 with the first-sector I-channel even data PS0_I-even outputted from the other switching element, a fifth AND gate 516 for ANDing the Q-channel blocking signal/Blk_Sig_Q0 with the first-sector I-channel odd data PS0_I_odd outputted from the other switching element, a sixth AND gate 517 for ANDing the input timing signal with its carry-out signal carry_o, and a second full adder 518 for receiving an output signal from the sixth AND gate 517 as a carry-in signal carry-_i, adding an output signal from the fourth AND gate 515 to the first-sector Q-channel even data included in the 6-sector forward data received thereto, outputting the resultant added value, adding an output signal from the fifth AND gate 516 to the first-sector Q-channel odd data included in the 6-sector forward data received thereto, and outputting the resultant added value, Each of the first and second digital summing sections 208 and 209 having the above mentioned configuration serves to add the 6-sector data, received from the preceding switching element stage, to its data. Each of these two data consists of unit data having a 2's complement format while having a length of 16 bits. Since 2 bits, that is, an even bit and an odd bit, are outputted at every system clock tick for each sector, data of one data unit is transmitted at every 8 system clock ticks. Since data is transmitted 2 bits by 2 bits in a serial fashion, its addition is conducted for each of 6 sectors, using the full adders of 2 bits. The operation of each full adder according to the control signal is carried out as follows:

1) The 16-th one of 16 bits is added after it is substituted by "0" because it is a parity bit;
2) Where the first value of unit data is added, this addition is conducted after resetting the input carry value to "0"; and
3) When a blocking condition occurs due to an error generated in the parity error checking section, the 6-sector signals received from the preceding switching element is added after being set to "0".

Thereafter, each of the first and second parity generating sections 210 and 211 checks the parity of the forward data outputted from an associated one of the first and second digital summing sections 208 and 209. The first or second parity generating section 210 or 211 inserts an odd parity into the 16-th of each unit data. In order to accurately determine the point of time when the parity to be checked is to be inserted, the timing signal generated from the timing generating section 212 is used.

Figure 9:
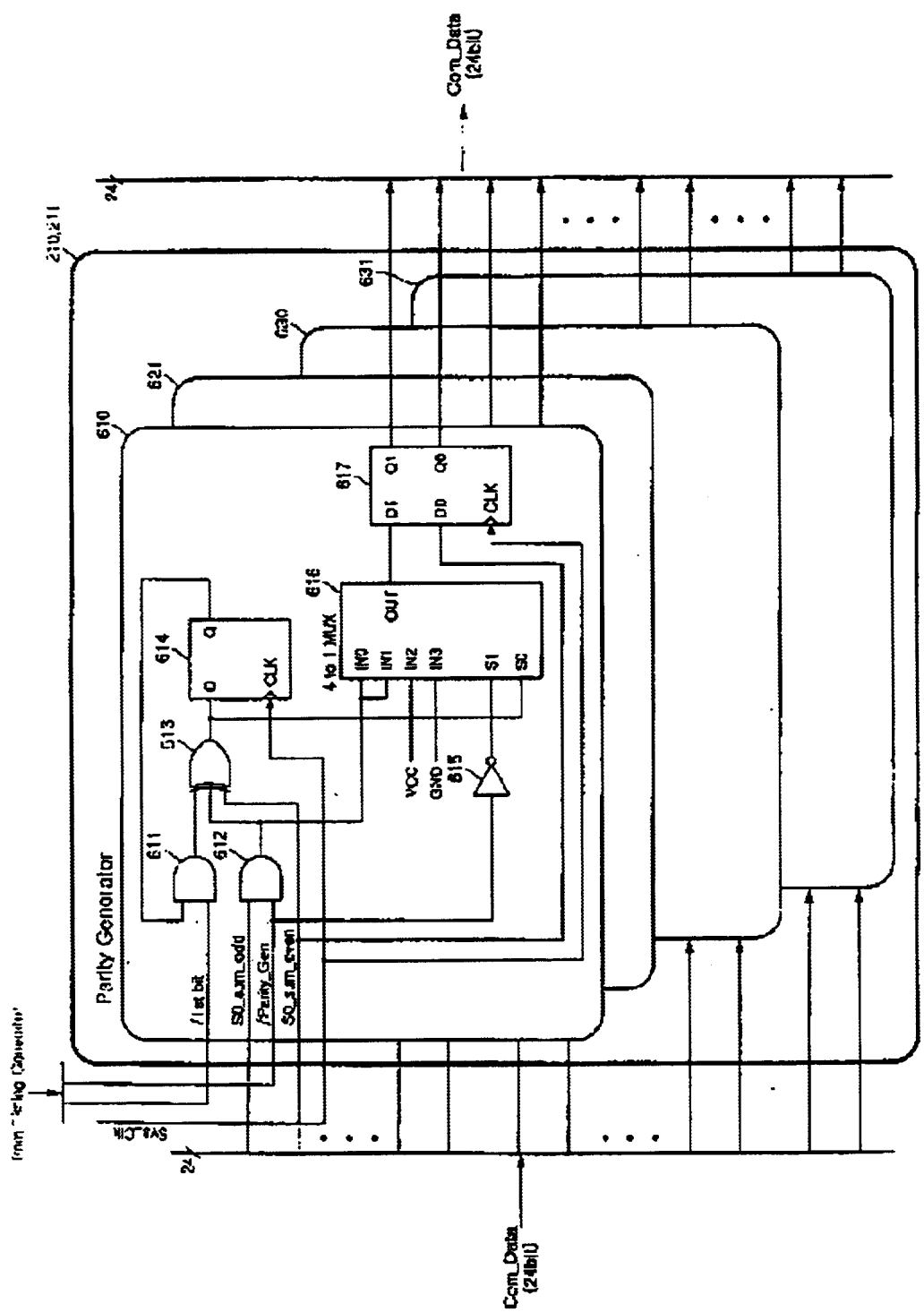
FIG. 9 is a circuit diagram illustrating each of first and second parity generating sections, shown in FIG. 3, in accordance with an embodiment of the present invention.

FIG. 9 is a circuit diagram illustrating a configuration of each of the first and second parity generating sections 210 and 211 in accordance with an embodiment of the present invention. The first or second parity generating section 210 or 211 includes 6-sector I-channel parity generators, and 6-sector Q-channel parity generators. In FIG. 9, a part of those parity generators are denoted by the reference numerals 610, 621, 630, and 631. For example, the parity generator 610 is an I-channel parity generator for the first one of 6 sectors. Each parity generator, for example, the first-sector I-channel parity generator 610, includes a first AND gate 611 for ANDing the first-bit timing signal/1st_bit, outputted from the timing generating section 212, with an output signal of a first flip-flop 614, a second AND gate 612 for ANDing the first-sector odd data S0_sum_odd, outputted from an associated one of the digital summing sections 208 and 209, with the parity checking timing signal/Parity_Gen, and an exclusive OR gate 613 for exclusively ORing respective output signals from the first and second AND gates 611 and 612 with the first-sector even data S0_sum_even, outputted from the associated digital summing section 208 or 209. The first flip-flop 614 is also included in the parity generator. The first flip-flop 614 serves to latch an output signal from the exclusive OR gate 613 in sync with the system clock. The parity generator further includes an inverter 615 for shifting the phase of the parity checking timing signal, a 4:1 selector 616 for receiving an output signal from the inverter 615 and the output signal from the exclusive OR gate 613, as select signals S1 and S0, and selectively outputting one of two input data IN0 and IN1 branched from an output signal from the second AND gate 612, a VCC input signal IN2, and a ground signal IN3, and a second flip-flop 617 for latching an output signal from the 4:1 selector 616 and the first-sector even data S0_sum_ even in sync with the system clock.

Practically, the parity generating section consists of 12 parity generators each having the above mentioned configuration.

The 6-sector forward data generated by each of the first and second parity generating sections 210 and 211 is transmitted to the BICA 143 via an associated one of the first and second multiplexers 219 and 220. Each of the first and second multiplexers 219 and 220 determines its output in accordance with an output execution mode set by an associated one of the first and second execution control registers 225 and 226. Where the output execution mode corresponds to a normal mode, the first or second multiplexer 219 or 220 selects data outputted from an associated one of the first and second parity generating section 210 or 211, and transmits the selected data to the BICA 143. For the output execution mode, there are various modes other than the normal mode. These modes other than the normal mode may be used in the case in which a parity error is generated. In these modes, for example, outputting of the 6-sector forward data generated from the preceding switching element is suppressed. Alternatively, all outputs may be rendered to have a value of "0".

Subsequently, each of the first and second parity error checking sections 213 and 214 checks whether or not the parity of the digital sum data received from the preceding signal element is an odd parity. Where the parity error checking section 213 or 214 determines the generation of a parity error, it activates the parity error signal/Parity_Err_Sig. The parity error signal/Parity_Err_Sig is updated at intervals of one unit data, that is, at every 8 system clocks. The updated parity error signal is transmitted to an associated one of the first and second interrupt generating sections 215 and 216 and an associated one of the first and second preceding switching element data input cut-off sections 217 and 218.

Figure 10:
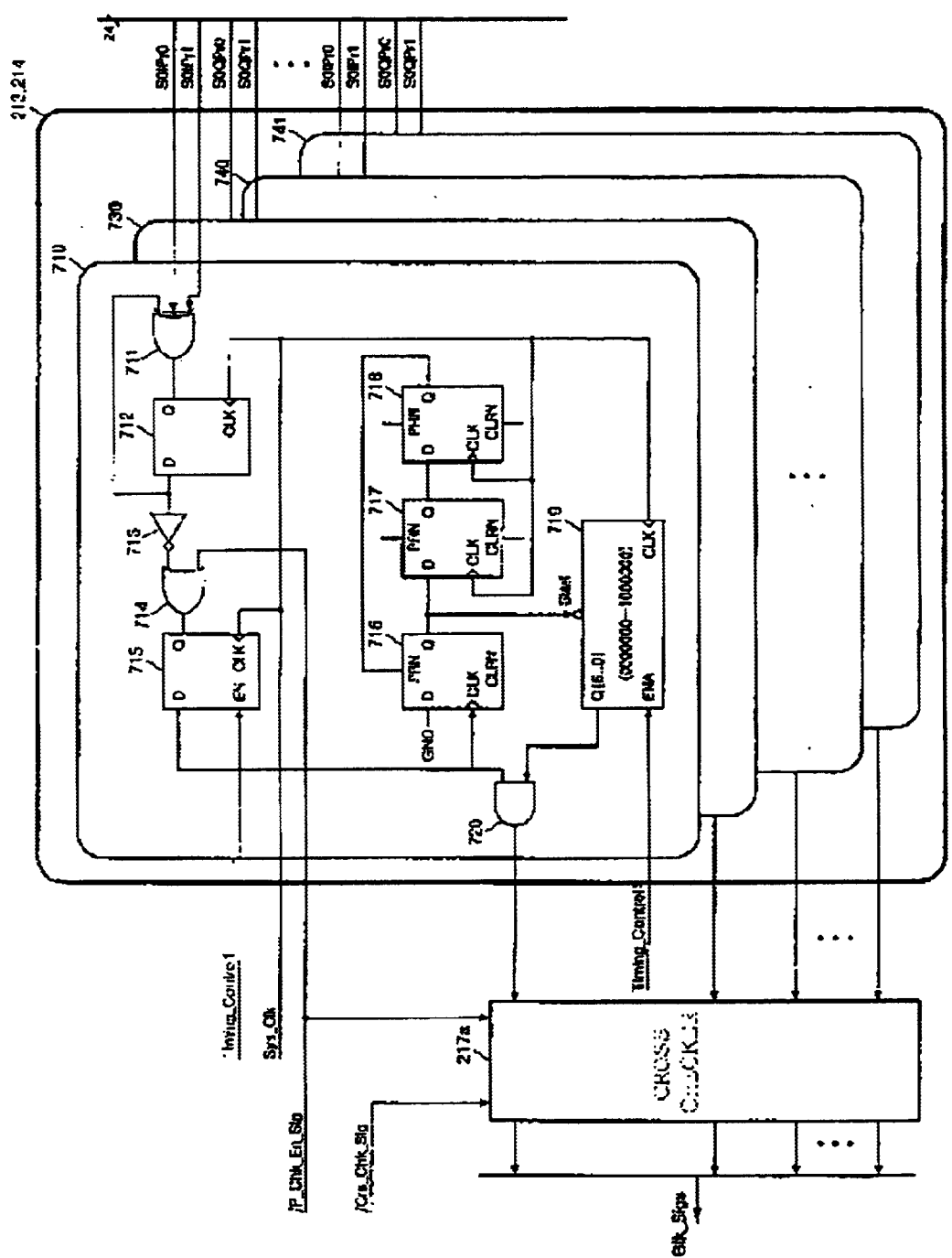
FIG. 10 is a circuit diagram illustrating each of first and second parity error checking sections and each of first and second preceding switching element data input cut-off sections, shown in FIG. 3, in accordance with an embodiment of the present invention.

As shown in FIG. 10, each of the first and second parity error checking sections 213 and 214 includes 6-sector I-channel parity error checkers, and 6-sector Q-channel parity error checkers. In FIG. 10, a part of those parity error checkers are denoted by the reference numerals 710, 730, 740, and 741. For example, the parity error checker 710 is an I-channel parity error checker for the first one of 6 sectors. Each parity error checker, for example, the first-sector I-channel parity error checker 710, includes an exclusive OR gate 711 for exclusively ORing the first-sector I-channel parities S0IPr0 and S0IPr1 of the forward data, transmitted from the preceding switching element, with an output signal of a first flip-flop 712 coupled to an output terminal of the exclusive OR gate 711. The first flip-flop 712 is also included in the parity error checker. The first flip-flop 712 serves to latch an output signal from the exclusive OR gate 711. The parity error checker further includes an inverter 713 for shifting the phase of an output signal from the first flip-flop 712, an OR gate 714 for ORing an output signal from the inverter 713 with the parity check enable signal/P_Chk_En_Sig externally inputted thereto, a second flip-flop 715 for latching an output signal from the OR gate 714 in sync with the system clock, a third flip-flop 716 for latching the ground signal in sync with an output signal from the second flip-flop 715, a fourth flip-flop 717 for latching an output signal from the third flip-flop 716, a fifth flip-flop 718 for latching an output signal from the fourth flip-flop 717, and applying the latched signal to a PRN terminal of the third flip-flop 716, a 7-bit counter 719 enabled in accordance with the timing control signal Timing_Control1 externally applied thereto and adapted to conduct a counting operation in response to the output signal from the third flip-flop 716 received thereto as a counting start signal, and an AND gate 720 for ANDing an output signal from the 7-bit counter 719 with the output signal from the second flip-flop 715, and outputting the resultant value as a parity error check signal.

In each parity error checker, for example, the parity error checker 710, its exclusive OR gate 711 exclusively ORs the first-sector I-channel parities S0IPr0 and S0IPr1 of the forward data, transmitted from the preceding switching element, with the output signal of a first flip-flop 712 coupled to the output terminal of the exclusive OR gate 711. The first flip-flop 712 latches the output signal from the exclusive OR gate 711. The inverter 713 shifts the phase of the output signal from the first flip-flop 712. The OR gate 714 ORs the output signal from the inverter 713 with the parity check enable signal/P_Chk_En_Sig externally inputted thereto. The second flip-flop 715 latches the output signal from the OR gate 714 in sync with the system clock, thereby outputting a parity error check signal/Parity_Err_Sig. The third flip-flop 716 latches the ground signal in sync with the output signal from the second flip-flop 715, thereby outputting the latched signal. The fourth flip-flop 717 latches the output signal from the third flip-flop 716. The fifth flip-flop 718 latches the output signal from the fourth flip-flop 717, and applies the latched signal to the PRN terminal of the third flip-flop 716. The 7-bit counter 719 is enabled in accordance with the timing control signal Timing Control1 externally applied thereto. In the enable state, the 7-bit counter 719 conducts a counting operation in response to the output signal from the third flip-flop 716 received thereto as a counting start signal. The output signal from the 7-bit counter 719 is ANDed with the output signal from the second flip-flop 715 in the AND gate 720 which, in turn, outputs the resultant value as a parity error check signal.

Where a parity error is detected by one of the first and second parity error checking sections 213 and 214, an associated one of the first and second interrupt generating sections 215 and 216 informs the controller of the CDMA channel card assembly of the error detection via an optional pin P_int. When the controller of the CDMA channel card assembly recognizes such an interrupt, it sends an interrupt clear signal/P_Int_Clr to the first and second interrupt generating sections 215 and 216 in order to allow the generation of a next interrupt.

Figure 11:
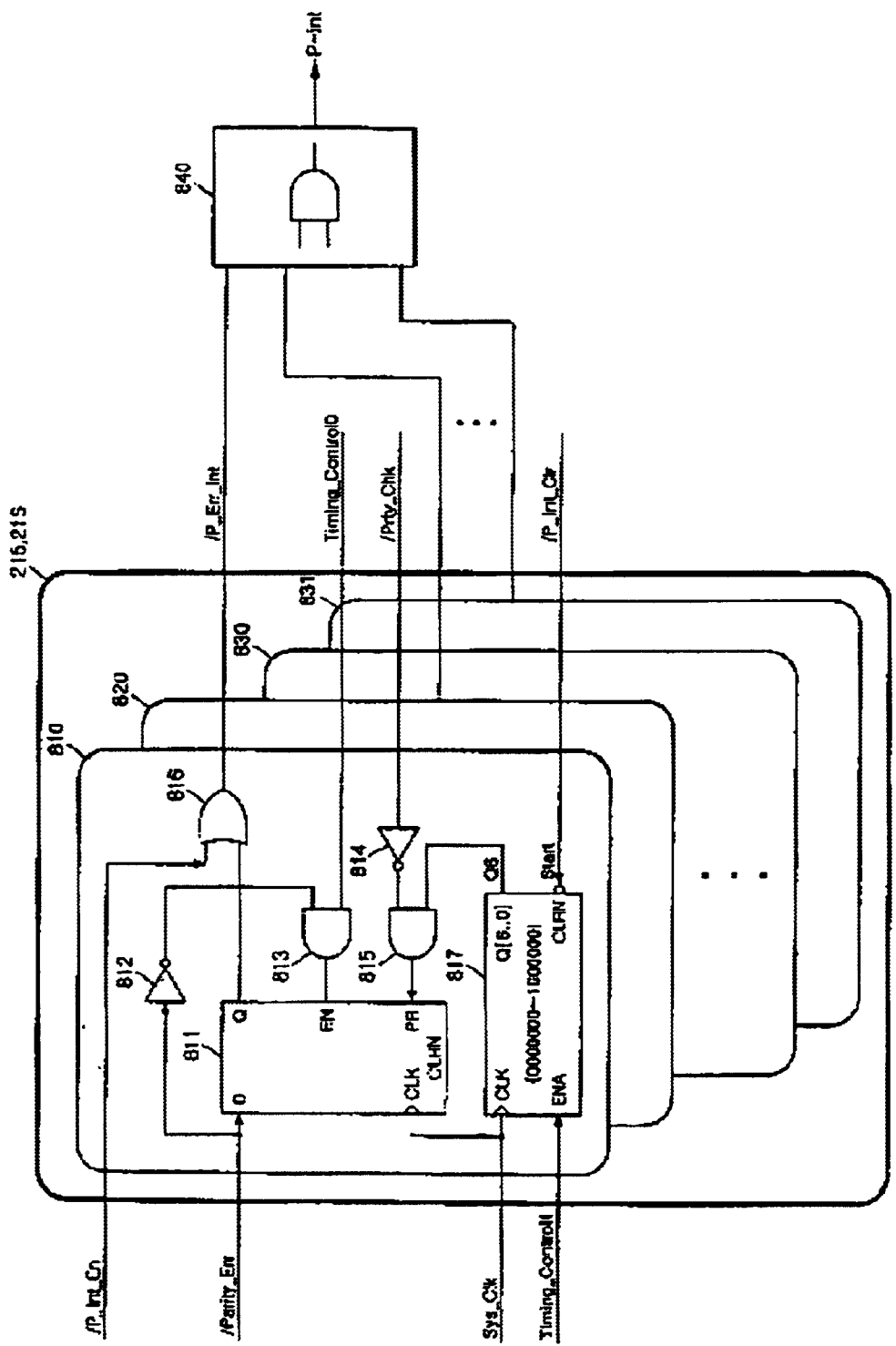
FIG. 11 is a circuit diagram illustrating each of first and second interrupt generating sections, shown in FIG. 3, in accordance with an embodiment of the present invention.

FIG. 11 is a circuit diagram illustrating a configuration of each of the first and second interrupt generating sections 215 and 216 in accordance with an embodiment of the present invention. The first or second interrupt generating section 215 and 216 includes 6-sector I-channel interrupt generators, and 6-sector Q-channel interrupt generators. In FIG. 11, a part of those interrupt generators are denoted by the reference numerals 810, 820, 830, and 831. For example, the interrupt generator 810 is an I-channel interrupt generator for the first one of 6 sectors. Each interrupt generator, for example, the first-sector I-channel interrupt generator 810, includes a 7-bit counter 817 enabled in accordance with a timing control signal Timing_Control1, externally applied thereto, and adapted to count system clocks, inputted thereto, in response to an parity interrupt clear signal/P_Int_Clr, a first inverter 814 for shifting the phase of a parity check signal/Prty_Chk applied thereto, a first AND gate 815 for ANDing an output signal from the first inverter 814 with an output signal from the 7-bit counter 817, a second inverter 812 for shifting the phase of a parity error check signal/Parity_Err applied thereto, a second AND gate 813 for ANDing an output signal from the second inverter 812 with a timing control signal Timing_Control0, a flip-flop 811 for receiving an output signal from the second AND gate 813, as its enable signal, receiving an output signal from the first AND gate 815 at a PR terminal thereof, and latching the parity error check signal/Parity_Err in sync with the system clock, and an OR gate 816 for ORing an output signal from the flip-flop 811 with a parity interrupt enable signal/P_Int_En externally applied thereto, and outputting the resultant value as a parity error interrupt signal/P_Err_Int.

In the interrupt generator having the above mentioned configuration, the 7-bit counter 817 is first enabled in accordance with the timing control signal Timing_Control1, externally applied thereto. In the enable state, the 7-bit counter 817 counts system clocks, inputted thereto, in response to the parity interrupt clear signal/P_Int_Clr. The first inverter 814 shifts the phase of the parity check signal/Prty_Chk applied thereto. The first AND gate 815 ANDs the output signal from the first inverter 814 with the output signal from the 7-bit counter 817, and applies the resultant value to the PR terminal of the flip-flop 811. The second inverter 812 shifts the phase of the parity error check signal/Parity_Err applied thereto. The second AND gate 813 ANDs the output signal from the second inverter 812 with the timing control signal Timing_Control0, and applies the resultant value to an enable terminal EN of the flip-flop 811. The flip-flop 811, which receives the output signal from the second AND gate 813, as its enable signal, and receives the output signal from the first AND gate 815 at the PR terminal thereof, latches the parity error check signal/Parity_Err in sync with the system clock.

The OR gate 816 ORs the output signal from the flip-flop 811 with the parity interrupt enable signal/P_Int_En externally applied thereto, and outputs the resultant value as a parity error interrupt signal/P_Err_Int.

The parity error interrupt signal/P_Err_Int outputted from each parity interrupt generator is applied to an AND gate 840 coupled to the output terminal of the parity interrupt generator. The AND gate 840 ANDs all output signals from 12 interrupt generators 810, and 820 to 831, and transmits the resultant value to the controller of the CDMA channel card assembly as a parity interrupt signal/P_int. That is, if a parity interrupt is generated at even one of the parity interrupt generators, the interrupt generating section then absolutely generates a parity interrupt signal which is, in turn, transmitted to the controller of the CDMA channel card assembly. Only when no parity interrupt is generated at any parity interrupt generators, the interrupt generating section generates no parity interrupt signal.

Where a parity error is generated, each of the first and second preceding switching element data input cut-off sections 217 and 218 generates a blocking signal Blk_Sig, and transmits the blocking signal Blk_Sig to an associated one of the first and second digital summing sections 208 and 209. In response to the blocking signal Blk_Sig, each of the first and second digital summing sections 208 and 209 cuts off the data outputted from the preceding switching element. Once a parity error is generate, 64 successive unit data are prevented from being inputted to the first and second digital summing sections 208 and 209 until no parity error is detected.

Referring to FIG. 10, a circuit of the first preceding switching element data input cut-off sections 217 according to an embodiment of the present invention is also illustrated. As shown in FIG. 10, the first preceding switching element data input cut-off section 217 includes a cross checker 217a which serves to check respective outputs of all parity error checkers 710, and 730 to 741 in the parity error checking section 213, thereby discriminating whether or not a parity error is generated. Where it is discriminated that a parity error is generated, the cross checker 217a transmits a blocking signal to the first digital summing section 208, thereby cutting off the data, outputted from the preceding switching element, from being inputted. The second preceding switching element data input cut-off sections 218 has the same configuration as the first preceding switching element data input cut-off sections 217 and functions in a similar manner to that of the first preceding switching element data input cut-off sections 217. Accordingly, no detailed description will be made in conjunction with the second preceding switching element data input cut-off sections 218 in order to avoid a repeated description.

Each of the first and second reverse switch sections 206 and 207 connects a 6-sector reverse signal, received from the BICA, to the three sectors of an associated one of the 3-sector cell site modems, in accordance with a switch control signal outputted from an associated one of the first and second switch controllers 202 and 203.

Figure 7:
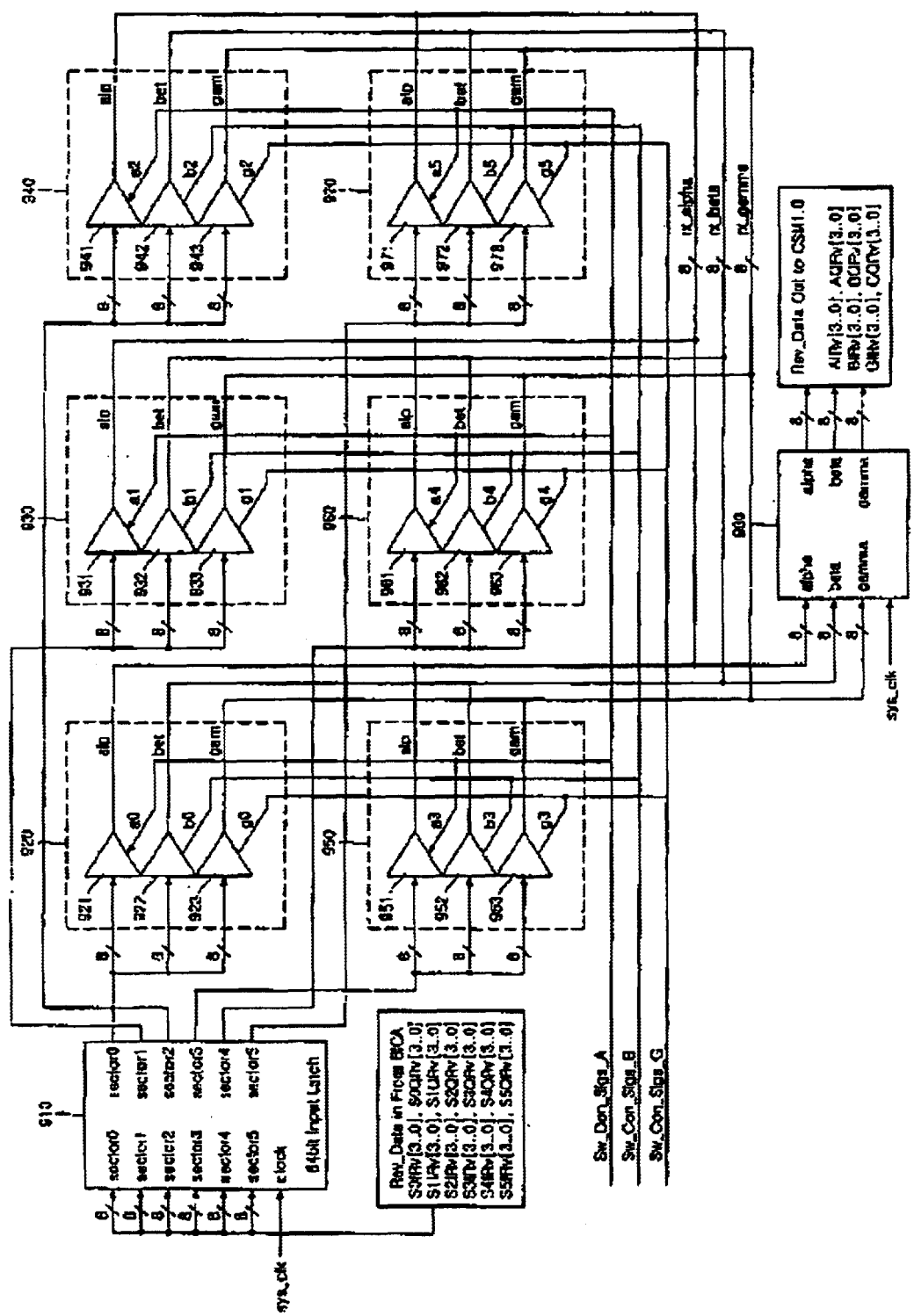
FIG. 7 is a circuit diagram illustrating each of first and second reverse switch sections, shown in FIG. 3, in accordance with an embodiment of the present invention.

FIG. 7 is a circuit diagram illustrating a configuration of each of the first and second reverse switch sections 206 and 207 in accordance with an embodiment of the present invention. Actually, circuits, which have the configuration shown in FIG. 7, are implemented in the first and second reverse switch sections 206 and 207, respectively. The circuits respectively implemented in the first and second reverse switch sections 206 and 207 have the same functions. Therefore, the following description will be made only in conjunction with one reverse switch section, for example, the first reverse switch section 206.

As shown in FIG. 7, the first reverse switch section 206 includes an input latch 910 for latching 6-sector reverse data (8 bits for each sector), outputted from the BICA, in sync with an input system clock, a first buffer section 920 for buffering a first-sector (sector-0) one of 6-sector signals, outputted from the input latch 910, in accordance with reverse 3-sector switching control signals Sw_Con_Sigs_A, Sw_Con_Sigs_B, and Sw_Con_Sigs_G outputted from the first switch controller 202, thereby outputting 3-sector signals a0, b0, and g0, a second buffer section 930 for buffering a second-sector (sector-1) one of the 6-sector signals, outputted from the input latch 910, in accordance with the reverse 3-sector switching control signals Sw_Con_Sigs_A, Sw_Con_Sigs_B, and Sw_Con_Sigs_G outputted from the first switch controller 202, thereby outputting 3-sector signals a1, b1, and g1, a third buffer section 940 for buffering a third-sector (sector-2) one of the 6-sector signals, outputted from the input latch 910, in accordance with the reverse 3-sector switching control signals Sw_Con_Sigs_A, Sw Con_Sigs_B, and Sw_Con_Sigs_G outputted from the first switch controller 202, thereby outputting 3-sector signals a2, b2, and g2, a fourth buffer section 950 for buffering a fourth-sector (sector-3) one of the 6-sector signals, outputted from the input latch 910, in accordance with the reverse 3-sector switching control signals Sw_Con_Sigs_A, Sw_Con_Sigs_B, and Sw_Con_Sigs_G outputted from the first switch controller 202, thereby outputting 3-sector signals a3, b3, and g3, a fifth buffer section 960 for buffering a fifth-sector (sector-4) one of the 6-sector signals, outputted from the input latch 910, in accordance with the reverse 3-sector switching control signals Sw_Con_Sigs_A, Sw_Con_Sigs_B, and Sw_Con_Sigs_G outputted from the first switch controller 202, thereby outputting 3-sector signals a4, b4, and g4, a sixth buffer section 970 for buffering a sixth-sector (sector-5) one of the 6-sector signals, outputted from the input latch 910, in accordance with the reverse 3-sector switching control signals Sw_Con_Sigs_A, Sw_Con_Sigs_B, and Sw_Con_Sigs_G outputted from the first switch controller 202, thereby outputting 3-sector signals a5, b5, and g5, and an output latch 980 for latching 3-sector signals, respectively buffered in the first through sixth buffer sections 920, for respective sectors, and outputting the latched signals.

The first buffer section 920 includes first through three 3-status buffers 921 to 923 each adapted to buffer a 8-bit signal for the first sector, thereby generating a 3-sector signal. The second buffer section 930 includes first through three 3-status buffers 931 to 933 each adapted to buffer a 8-bit signal for the second sector, thereby generating a 3-sector signal. The third buffer section 940 includes first through three 3-status buffers 941 to 943 each adapted to buffer a 8-bit signal for the third sector, thereby generating a 3-sector signal. The fourth buffer section 950 includes first through three 3-status buffers 951 to 953 each adapted to buffer a 8-bit signal for the fourth sector, thereby generating a 3-sector signal. The fifth buffer section 960 includes first through three 3-status buffers 961 to 963 each adapted to buffer a 8-bit signal for the fifth sector, thereby generating a 3-sector signal. The sixth buffer section 970 includes first through three 3-status buffers 971 to 973 each adapted to buffer a 8-bit signal for the sixth sector, thereby generating a 3-sector signal.

In the first reverse switch section 206 having the above mentioned configuration, the input latch 910 latches 6-sector reverse data (8 bits for each sector), outputted from the BICA, in sync with an input system clock.

The first buffer section 920 buffers the first-sector (sector-0) one of 6-sector signals, outputted from the input latch 910, using the first through three 3-status buffers 921 to 923 in accordance with reverse 3-sector switching control signals Sw_Con_Sigs_A, Sw_Con_Sigs_B, and Sw_Con_Sigs_G outputted from the first switch controller 202, thereby outputting 3-sector signals a0, b0, and g0, respectively.

The second buffer section 930 buffers the second-sector (sector-1) one of the 6-sector signals, outputted from the input latch 910, using the first through three-status buffers 931 to 933 in accordance with the reverse 3-sector switching control signals Sw_Con_Sigs_A, Sw_Con_Sigs_B, and Sw_Con_Sigs_G outputted from the first switch controller 202, thereby outputting 3-sector signals a1, b1, and g1, respectively.

Similarly, the third buffer section 940 buffers the third-sector (sector-2) one of the 6-sector signals, outputted from the input latch 910, using the first through three-status buffers 941 to 943 in accordance with the reverse 3-sector switching control signals Sw_Con_Sigs_A, Sw_Con_Sigs_B, and Sw_Con_Sigs_G outputted from the first switch controller 202, thereby outputting 3-sector signals a2, b2, and g2, respectively.

Also, the fourth buffer section 950 buffers the fourth-sector (sector-3) one of the 6-sector signals, outputted from the input latch 910, using the first through three-status buffers 951 to 953 in accordance with the reverse 3-sector switching control signals Sw_Con_Sigs_A, Sw_Con_Sigs_B, and Sw_Con_Sigs_G outputted from the first switch controller 202, thereby outputting 3-sector signals a3, b3, and g3, respectively.

The fifth buffer section 960 buffers the fifth-sector (sector-4) one of the 6-sector signals, outputted from the input latch 910, using the first through three-status buffers 961 to 963 in accordance with the reverse 3-sector switching control signals Sw_Con_Sigs_A, Sw_Con_Sigs_B, and Sw_Con_Sigs_G outputted from the first switch controller 202, thereby outputting 3-sector signals a4, b4, and g4, respectively.

Similarly, the sixth buffer section 970 buffers the sixth-sector (sector-5) one of the 6-sector signals, outputted from the input latch 910, using the first through three-status buffers 971 to 973 in accordance with the reverse 3-sector switching control signals Sw_Con_Sigs_A, Sw_Con_Sigs_B, and Sw_Con_Sigs_G outputted from the first switch controller 202, thereby outputting 3-sector signals a5, b5, and g5, respectively.

The output latch 980 then latches 3-sector signals, respectively buffered in the first through sixth buffer sections 920, for respective sectors, and transmits the latched signals to the associated cell site modem.

As apparent from the above description, a digital unit is implemented using switching elements in designing a multi-sector base station in accordance with the present invention. Accordingly, a softer handoff can be conducted between multi-sectors. This enables an efficient use of channel resources. Where the existing system is applied as it is, it is possible to further simply configure a multi-section base station.

Since one digital unit can support 6 sectors, the overall configuration of the multi-sector base station system can be simplified and easily made. Also, data of channel elements can be connected to any one of 6 sectors via switching elements in accordance with the present invention. Accordingly, it is possible to allocate an increased number of channel elements in sectors with heavy traffic while allocating a reduced number of channel elements in sectors with light traffic.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. In a digital unit of a multi-sector base station system including at least one code division multiple access (CDMA) channel card assembly having at least two cell site modems, and a controller adapted to control the overall operation of the CDMA channel card assembly, at least one baseband and intermediate frequency conversion card assembly, and at least one shelf control and routing card assembly, a switching device comprising a switching element coupled between the cell site modems, the switching element comprising:

a function decoder for receiving an address signal and a write/read signal acquired from the controller of the CDMA channel card assembly, decoding the received signals, and transmitting an enable signal to each block of the switching element, based on the decoding result;

first and second switch controllers adapted to decode a switch control command outputted from the CDMA channel card assembly, thereby generating switch control signals, respectively;

first and second forward switch sections adapted to distribute 3-sector forward signals outputted from the two cell site modems, into 6-sector signals, in accordance with the switch control signals outputted from the first and second switch controllers, respectively;

first and second reverse switch sections adapted to connect 6-sector reverse signals, received from the baseband and intermediate frequency conversion card assembly, to respective sectors of the 3-sector cell site modems, based on respective switch control signals outputted from the first and second switch controllers;

first and second digital summing sections adapted to adding the 6-sector data outputted from the first and second forward switch sections to 6-sector data received from a preceding switching element stage, respectively;

first and second parity generating sections adapted to check respective parities of forward data outputted from the first and second digital summing sections, each of the first and second parity generating sections inserting an odd parity into the last bit of each unit data;

a timing generating section for generating a timing clock in response to every system clock in sync with an input even second clock, and transmitting the timing clock to each block of the switching element;

first and second parity error checking sections each adapted to check whether or not the parity of digital sum data transmitted from the preceding switching element stage is an odd parity, and to activate a parity error signal when it is determined that a parity error is generated;

first and second interrupt generating sections respectively adapted to generate interrupt signals when parity errors are detected by the first and second parity error checking sections; and first and second preceding switching element data input cut-off sections adapted to cut off the data, outputted from the preceding switching element stage, in response to the generation of the parity errors, thereby preventing the data from being inputted to the first and second digital summing sections, respectively.

2. The switching device according to claim 1, further comprising:

first and second multiplexers adapted to multiplex respective forward data outputted from the first and second parity generating sections with respective forward data outputted from the preceding switching element stage;

first and second block status registers adapted to store respective data input cut-off status values outputted from the first and second preceding switching element data input cut-off sections;

first and second interrupt status registers adapted to store respective interrupt generation status values outputted from the first and second interrupt generating sections; and first and second execution control registers adapted to store execution control select signals, respectively.

3. The switching device according to claim 1, wherein the function decoder generates:

a signal (Sw_Reg_Sel_Sigs) activated when the controller writes switch control information in the switching element;

a signal (Blk_Sts_Sel) activated when the controller reads the first and second blocking status registers;

a signal (Int_Sts_Sel) activated when the controller writes mode setting data in the first and second execution control registers so as to set a mode of the switching element; and a signal (Int_Clr_sig) activated when the controller clears an interrupt generated.

4. The switching device according to claim 1, wherein each of the first and second switch controller comprises:

a latch for latching switch control information (Sw_Con_Data), received thereto, in accordance with a write signal (WR), a read signal (RD), and a chip select signal (CS) outputted from the function decoder; and first through third decoders for generating first through third control signals (Sw_Con_Sigs_A, Sw_Con_Sigs_B, and Sw_Con_Sigs_G), previously stored, in accordance with an output signal from the latch.

5. The switching device according to claim 1, wherein each of the first and second forward switch sections comprises:

a latch for latching 3-sector forward data (4 bits for each sector), outputted from an associated one of the cell site modems, in sync with the system clock applied thereto;

a first buffer section for buffering 4-bit α-sector data, included in output data from the latch, in accordance with α-sector switch control signal (Sw_Con_Siga_A) included in the switch control signal outputted from an associated one of the first and second switch controllers, thereby outputting 6-sector signals (s0 to s5);

a second buffer section for buffering 4-bit β-sector data, included in the output data from the latch, in accordance with β-sector switch control signal (Sw_Con_Siga_B) included in the switch control signal outputted from the associated first or second switch controller, thereby outputting 6-sector signals (s0 to s5); and a third buffer section for buffering 4-bit γ-sector data, included in the output data from the latch, in accordance with γ-sector switch control signal (Sw_Con_Siga_G) included in the switch control signal outputted from the associated first or second switch controller, thereby outputting 6-sector signals (s0 to s5).

6. The switching device according to claim 5, wherein each of the first through third buffer sections comprises first through six 3-status buffers each adapted to distribute an input 4-bit α-sector signal into a 6-sector signal.

7. The switching device according to claim 1, wherein each of the first and second digital summing sections comprises six digital combiners for summing 1-sector digital signals together, each of the digital combiners comprising:

a first AND gate for ANDing an I-channel blocking signal (/Blk_Sig_I0) with first-sector I-channel even data (PS0_I_even) outputted from another switching element;

a second AND gate for ANDing the I-channel blocking signal (/Blk_Sig_I0) with first-sector I-channel odd data (PS0_I_odd) outputted from the another switching element;

a third AND gate for ANDing an input timing signal with a carry-out signal (carry_o) thereof;

a first full adder for receiving an output signal from the third AND gate as a carry-in signal (carry_i), adding an output signal from the first AND gate to the first-sector I-channel even data included in the 6-sector forward data received thereto, outputting the resultant added value, adding an output signal from the second AND gate to the first-sector I-channel odd data included in the 6-sector forward data received thereto, and outputting the resultant added value;

a fourth AND gate for ANDing a Q-channel blocking signal (/Blk_Sig_Q0) with the first-sector I-channel even data (PS0_I_even) outputted from the another switching element;

a fifth AND gate for ANDing the Q-channel blocking signal (/Blk_Sig_Q0) with the first-sector I-channel odd data (PS0_I_odd) outputted from the other switching element;

a sixth AND gate for ANDing the input timing signal with a carry-out signal (carry_o) thereof; and a second full adder for receiving an output signal from the sixth AND gate as a carry-in signal (carry-_i), adding an output signal from the fourth AND gate to the first-sector Q-channel even data included in the 6-sector forward data received thereto, outputting the resultant added value, adding an output signal from the fifth AND gate to the first-sector Q-channel odd data included in the 6-sector forward data received thereto, and outputting the resultant added value.

8. The switching device according to claim 1, wherein each of the parity generating sections comprises 12 parity generators each adapted to generate 6-sector I and Q-channel parities, each of the parity generators comprising:

a first AND gate for ANDing a first-bit timing signal (/1st_bit), outputted from the timing generating section, with an output signal of a first flip-flop;

a second AND gate for ANDing a first-sector odd data (S0_sum_odd), outputted from an associated one of the digital summing sections, with a parity checking timing signal (/Parity_Gen);

an exclusive OR gate for exclusively ORing respective output signals from the first and second AND gates with a first-sector even data (S0_sum_even), outputted from an associated one of the digital summing sections;

the first flip-flop for latching an output signal from the exclusive OR gate in sync with the system clock;

an inverter for shifting the phase of the parity checking timing signal;

a 4:1 selector for receiving an output signal from the inverter and the output signal from the exclusive OR gate, as select signals (S1 and S0), and selectively outputting one of two input data (IN0 and IN1) branched from an output signal from the second AND gate, a VCC input signal (IN2), and a ground signal (IN3); and a second flip-flop for latching an output signal from the 4:1 selector and the first-sector even data (S0_sum_even) in sync with the system clock.

9. The switching device according to claim 1, wherein each of the first and second parity error checking sections comprises twelve parity error checkers adapted to check 6-sector I and Q-channel parity error checkers, each of the parity error checks comprising:

an exclusive OR gate for exclusively ORing first-sector I-channel parities (S0IPr0 and S0IPr1) of forward data, transmitted from the preceding switching element stage, with an output signal of a first flip-flop coupled to an output terminal of the exclusive OR gate;

the first flip-flop for latching an output signal from the exclusive OR gate;

an inverter for shifting the phase of an output signal from the first flip-flop;

an OR gate for ORing an output signal from the inverter with a parity check enable signal (/P_Chk_En_Sig) externally inputted thereto;

a second flip-flop for latching an output signal from the OR gate in sync with the system clock;

a third flip-flop for latching a ground signal in sync with an output signal from the second flip-flop;

a fourth flip-flop for latching an output signal from the third flip-flop;

a fifth flip-flop for latching an output signal from the fourth flip-flop, and applying the latched signal to a PRN terminal of the third flip-flop;

a 7-bit counter enabled in accordance with a timing control signal (Timing_Control1) externally applied thereto and adapted to conduct a counting operation in response to the output signal from the third flip-flop received thereto as a counting start signal; and an AND gate for ANDing an output signal from the 7-bit counter with the output signal from the second flip-flop, and outputting the resultant value as a parity error check signal.

10. The switching device according to claim 1, wherein each of the first and second interrupt generating sections comprises twelve interrupt generators adapted to generate 6-sector I and Q-channel interrupt signals generators, each of the interrupt generators comprising:

a 7-bit counter enabled in accordance with a timing control signal (Timing_Control1), externally applied thereto, and adapted to count system clocks, inputted thereto, in a response to an parity interrupt clear signal (/P_Int_Clr);

a first inverter for shifting the phase of a parity check signal (/Prty_Chk) applied thereto;

a first AND gate for ANDing an output signal from the first inverter with an output signal from the 7-bit counter;

a second inverter for shifting the phase of a parity error check signal (/Parity_Err) applied thereto;

a second AND gate for ANDing an output signal from the second inverter with a timing control signal (Timing_Control0);

a flip-flop for receiving an output signal from the second AND gate, as an enable signal thereof, receiving an output signal from the first AND gate at a PR terminal thereof, and latching the parity error check signal (/Parity_Err) in sync with the system clock; and an OR gate for ORing an output signal from the flip-flop with a parity interrupt enable signal (/P_Int_En) externally applied thereto, and outputting the resultant value as a parity error interrupt signal (/P_Err_Int).

11. The switching device according to claim 1, wherein each of the first and second preceding switching element data input cut-off sections comprises a cross checker for checking respective outputs of all parity error checkers included in an associated one of the first and second parity error checking sections, thereby discriminating whether or not a parity error is generated, the cross checker transmitting a blocking signal to an associated one of the first and second digital summing sections when a parity error is generated, thereby preventing data from the preceding switching element stage from being inputted.

12. The switching device according to claim 1, wherein each of the first and second reverse switch sections comprises:

an input latch for latching 6-sector reverse data (8 bits for each sector), outputted from the base station and intermediate frequency conversion card assembly, in sync with the system clock applied thereto;

a first buffer section for buffering a first-sector (sector-0) one of 6-sector signals, outputted from the input latch, in accordance with reverse 3-sector switching control signals (Sw_Con_Sigs_A, Sw_Con_Sigs_B, and Sw_Con_Sigs_G) outputted from an associated one of the first and second switch controllers, thereby outputting 3-sector signals (a0, b0, and g0);

a second buffer section for buffering a second-sector (sector-1) one of the 6-sector signals, outputted from the input latch, in accordance with the reverse 3-sector switching control signals (Sw_Con_Sigs_A, Sw_Con_Sigs_B, and Sw_Con_Sigs_G) outputted from the associated first or second switch controller, thereby outputting 3-sector signals (a1, b1, and g1);

a third buffer section for buffering a third-sector (sector-2) one of the 6-sector signals, outputted from the input latch, in accordance with the reverse 3-sector switching control signals (Sw_Con_Sigs_A, Sw_Con_Sigs_B, and Sw_Con_Sigs_G) outputted from the associated first or second switch controller, thereby outputting 3-sector signals (a2, b2, and g2);

a fourth buffer section for buffering a fourth-sector (sector-3) one of the 6-sector signals, outputted from the input latch, in accordance with the reverse 3-sector switching control signals (Sw_Con_Sigs_A, Sw_Con_Sigs_B, and Sw_Con_Sigs_G) outputted from the associated first or second switch controller, thereby outputting 3-sector signals (a3, b3, and g3);

a fifth buffer section for buffering a fifth-sector (sector-4) one of the 6-sector signals, outputted from the input latch, in accordance with the reverse 3-sector switching control signals (Sw_Con_Sigs_A, Sw_Con_Sigs_B, and Sw_Con_Sigs_G) outputted from the associated first or second switch controller, thereby outputting 3-sector signals (a4, b4, and g4);

a sixth buffer section for buffering a sixth-sector (sector-5) one of the 6-sector signals, outputted from the input latch, in accordance with the reverse 3-sector switching control signals (Sw_Con_Sigs_A, Sw_Con_Sigs_B, and Sw_Con_Sigs_G) outputted from the associated first or second switch controller, thereby outputting 3-sector signals (a5, b5, and g5); and an output latch for latching 3-sector signals, respectively buffered in the first through sixth buffer sections, for respective sectors, and outputting the latched signals.

13. The switching device according to claim 12, wherein each of the first through six buffer sections comprises first through three 3-status buffers each adapted to buffer a 8-bit signal for an associated one of first through six sectors, thereby generating a 3-sector signal.

* * * * *